US011007937B2

(12) United States Patent
Byrne et al.

(10) Patent No.: US 11,007,937 B2
(45) Date of Patent: *May 18, 2021

(54) VEHICULAR DISPLAY SYSTEM WITH MULTI-PANED IMAGE DISPLAY

(71) Applicant: MAGNA ELECTRONICS INC., Auburn Hills, MI (US)

(72) Inventors: Steven V. Byrne, Goodrich, MI (US); Yuesheng Lu, Farmington Hills, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/665,071

(22) Filed: Oct. 28, 2019

(65) Prior Publication Data

US 2020/0055454 A1 Feb. 20, 2020

Related U.S. Application Data

(63) Continuation of application No. 13/852,190, filed on Mar. 28, 2013, now Pat. No. 10,457,209, which is a
(Continued)

(51) Int. Cl.
*B60R 1/00* (2006.01)
*G06T 3/00* (2006.01)

(52) U.S. Cl.
CPC ............... *B60R 1/00* (2013.01); *G06T 3/005* (2013.01); *B60R 2300/30* (2013.01)

(58) Field of Classification Search
CPC ........ B60R 1/00; B60R 2300/30; G06T 3/005
See application file for complete search history.

(56) References Cited

U.S. PATENT DOCUMENTS 4,645,975 A 2/1987 Meitzler et al.
4,692,798 A 9/1987 Seko et al.
(Continued)

FOREIGN PATENT DOCUMENTS

EP 0353200 A2 1/1990
EP 0640903 A1 3/1995
(Continued)

OTHER PUBLICATIONS

Achler et al., "Vehicle Wheel Detector using 2D Filter Banks," IEEE Intelligent Vehicles Symposium of Jun. 2004.
(Continued)

*Primary Examiner* — Richard A Hansell, Jr.
(74) *Attorney, Agent, or Firm* — Honigman LLP

(57) ABSTRACT

A vehicular display system includes a camera configured to be positioned on a vehicle and a processing system for processing image data captured by the camera. The image data is representative of a scene viewed by the camera. The processing system generates an output representative of an image having three image panes including a central image pane derived from a first subset of captured image data and two side image panes derived from second and third subsets of captured image data. Each of the side image panes are shaped and arranged with respect to the central image pane to have non-parallel upper edges and non-parallel lower edges. A display device, responsive to the output generated by the processing system, displays the image for viewing by a driver of the vehicle.

20 Claims, 19 Drawing Sheets

Related U.S. Application Data continuation-in-part of application No. PCT/US2013/027342, filed on Feb. 22, 2013.

(60) Provisional application No. 61/745,864, filed on Dec. 26, 2012, provisional application No. 61/700,617, filed on Sep. 13, 2012, provisional application No. 61/616,855, filed on Mar. 28, 2012, provisional application No. 61/601,669, filed on Feb. 22, 2012.

(56) References Cited

U.S. PATENT DOCUMENTS

| | | | |
|---|---|---|---|
| 4,713,685 | A | 12/1987 | Nishimura et al. |
| 4,931,937 | A | 6/1990 | Kakinami et al. |
| 4,967,319 | A | 10/1990 | Seko |
| 4,970,653 | A | 11/1990 | Kenue |
| 5,059,877 | A | 10/1991 | Teder |
| 5,096,287 | A | 3/1992 | Kakinami et al. |
| 5,160,971 | A | 11/1992 | Koshizawa |
| 5,161,632 | A | 11/1992 | Asayama |
| 5,165,108 | A | 11/1992 | Asayama |
| 5,166,681 | A | 11/1992 | Bottesch et al. |
| 5,177,606 | A | 1/1993 | Koshizawa |
| 5,214,408 | A | 5/1993 | Asayama |
| 5,223,907 | A | 6/1993 | Asayama |
| 5,230,400 | A | 7/1993 | Kakinami et al. |
| 5,245,422 | A | 9/1993 | Borcherts et al. |
| 5,289,321 | A | 2/1994 | Secor |
| 5,291,424 | A | 3/1994 | Asayama et al. |
| 5,298,732 | A | 3/1994 | Chen |
| 5,313,072 | A | 5/1994 | Vachss |
| 5,329,206 | A | 7/1994 | Slotkowski et al. |
| 5,336,980 | A | 8/1994 | Levers |
| 5,379,196 | A | 1/1995 | Kobayashi et al. |
| 5,386,285 | A | 1/1995 | Asayama |
| 5,414,461 | A | 5/1995 | Kishi et al. |
| 5,424,952 | A | 6/1995 | Asayama |
| 5,426,294 | A | 6/1995 | Kobayashi et al. |
| 5,444,478 | A | 8/1995 | Lelong et al. |
| 5,483,060 | A | 1/1996 | Sugiura et al. |
| 5,483,168 | A | 1/1996 | Reid |
| 5,487,116 | A | 1/1996 | Nakano et al. |
| 5,488,496 | A | 1/1996 | Pine |
| 5,493,392 | A | 2/1996 | Blackmon et al. |
| 5,498,866 | A | 3/1996 | Bendicks et al. |
| 5,500,766 | A | 3/1996 | Stonecypher |
| 5,508,592 | A | 4/1996 | Lapatovich et al. |
| 5,510,983 | A | 4/1996 | Lino |
| 5,515,448 | A | 5/1996 | Nishitani |
| 5,521,633 | A | 5/1996 | Nakajima et al. |
| 5,528,698 | A | 6/1996 | Kamei et al. |
| 5,529,138 | A | 6/1996 | Shaw et al. |
| 5,530,240 | A | 6/1996 | Larson et al. |
| 5,530,420 | A | 6/1996 | Tsuchiya et al. |
| 5,530,771 | A | 6/1996 | Maekawa |
| 5,535,144 | A | 7/1996 | Kise |
| 5,535,314 | A | 7/1996 | Alves et al. |
| 5,537,003 | A | 7/1996 | Bechtel et al. |
| 5,539,397 | A | 7/1996 | Asanuma et al. |
| 5,541,590 | A | 7/1996 | Nishio |
| 5,550,677 | A | 8/1996 | Schofield et al. |
| 5,555,136 | A | 9/1996 | Waldmann et al. |
| 5,555,312 | A | 9/1996 | Shima et al. |
| 5,555,555 | A | 9/1996 | Sato et al. |
| 5,559,695 | A | 9/1996 | Daily |
| 5,568,027 | A | 10/1996 | Teder |
| 5,568,316 | A | 10/1996 | Schrenk et al. |
| 5,574,443 | A | 11/1996 | Hsieh |
| 5,581,464 | A | 12/1996 | Woll et al. |
| 5,582,383 | A | 12/1996 | Mertens et al. |
| 5,594,222 | A | 1/1997 | Caldwell |
| 5,612,686 | A | 3/1997 | Takano et al. |
| 5,612,883 | A | 3/1997 | Shaffer et al. |
| 5,614,788 | A | 3/1997 | Mullins |
| 5,619,370 | A | 4/1997 | Guinosso |
| 5,627,586 | A | 5/1997 | Yamasaki |
| 5,633,944 | A | 5/1997 | Guibert et al. |
| 5,634,709 | A | 6/1997 | Iwama |
| 5,638,116 | A | 6/1997 | Shimoura et al. |
| 5,642,299 | A | 6/1997 | Hardin et al. |
| 5,646,612 | A | 7/1997 | Byon |
| 5,648,835 | A | 7/1997 | Uzawa |
| 5,650,944 | A | 7/1997 | Kise |
| 5,660,454 | A | 8/1997 | Mod et al. |
| 5,661,303 | A | 8/1997 | Teder |
| 5,670,935 | A | 9/1997 | Schofield et al. |
| 5,673,019 | A | 9/1997 | Dantoni |
| 5,675,489 | A | 10/1997 | Pomerleau |
| 5,676,484 | A | 10/1997 | Chamberlin et al. |
| 5,677,851 | A | 10/1997 | Kingdon et al. |
| 5,680,263 | A | 10/1997 | Zimmermann et al. |
| 5,699,044 | A | 12/1997 | Van Lente et al. |
| 5,699,057 | A | 12/1997 | Ikeda et al. |
| 5,699,149 | A | 12/1997 | Kuroda et al. |
| 5,707,129 | A | 1/1998 | Kobayashi |
| 5,724,316 | A | 3/1998 | Brunts |
| 5,737,226 | A | 4/1998 | Olson et al. |
| 5,757,949 | A | 5/1998 | Kinoshita et al. |
| 5,760,826 | A | 6/1998 | Nayar |
| 5,760,828 | A | 6/1998 | Cortes |
| 5,760,931 | A | 6/1998 | Saburi et al. |
| 5,760,962 | A | 6/1998 | Schofield et al. |
| 5,761,094 | A | 6/1998 | Olson et al. |
| 5,764,139 | A | 6/1998 | Nojima et al. |
| 5,765,116 | A | 6/1998 | Wilson-Jones et al. |
| 5,765,940 | A | 6/1998 | Levy et al. |
| 5,781,437 | A | 7/1998 | Wiemer et al. |
| 5,786,772 | A | 7/1998 | Schofield et al. |
| 5,790,403 | A | 8/1998 | Nakayama |
| 5,790,973 | A | 8/1998 | Blaker et al. |
| 5,793,308 | A | 8/1998 | Rosinski et al. |
| 5,793,420 | A | 8/1998 | Schmidt |
| 5,808,589 | A | 9/1998 | Fergason |
| 5,811,888 | A | 9/1998 | Hsieh |
| 5,835,255 | A | 11/1998 | Miles |
| 5,835,613 | A | 11/1998 | Breed et al. |
| 5,837,994 | A | 11/1998 | Stam et al. |
| 5,841,126 | A | 11/1998 | Fossum et al. |
| 5,844,505 | A | 12/1998 | Van Ryzin |
| 5,844,682 | A | 12/1998 | Kiyomoto et al. |
| 5,845,000 | A | 12/1998 | Breed et al. |
| 5,848,802 | A | 12/1998 | Breed et al. |
| 5,850,176 | A | 12/1998 | Kinoshita et al. |
| 5,850,254 | A | 12/1998 | Takano et al. |
| 5,867,591 | A | 2/1999 | Onda |
| 5,877,707 | A | 3/1999 | Kowalick |
| 5,877,897 | A | 3/1999 | Schofield et al. |
| 5,878,370 | A | 3/1999 | Olson |
| 5,883,739 | A | 3/1999 | Ashihara et al. |
| 5,884,212 | A | 3/1999 | Lion |
| 5,890,021 | A | 3/1999 | Onoda |
| 5,890,083 | A | 3/1999 | Franke et al. |
| 5,896,085 | A | 4/1999 | Mori et al. |
| 5,899,956 | A | 5/1999 | Chan |
| 5,904,725 | A | 5/1999 | Iisaka et al. |
| 5,912,534 | A | 6/1999 | Benedict |
| 5,914,815 | A | 6/1999 | Bos |
| 5,922,036 | A | 7/1999 | Yasui et al. |
| 5,923,027 | A | 7/1999 | Stam et al. |
| 5,929,784 | A | 7/1999 | Kawaziri et al. |
| 5,929,786 | A | 7/1999 | Schofield et al. |
| 5,938,320 | A | 8/1999 | Crandall |
| 5,940,120 | A | 8/1999 | Frankhouse et al. |
| 5,942,853 | A | 8/1999 | Piscart |
| 5,949,331 | A | 9/1999 | Schofield et al. |
| 5,956,181 | A | 9/1999 | Lin |
| 5,959,367 | A | 9/1999 | O'Farrell et al. |
| 5,959,555 | A | 9/1999 | Furuta |
| 5,963,247 | A | 10/1999 | Banitt |
| 5,964,822 | A | 10/1999 | Alland et al. |
| 5,971,552 | A | 10/1999 | O'Farrell et al. |
| 5,986,796 | A | 11/1999 | Miles |
| 5,990,469 | A | 11/1999 | Bechtel et al. |
| 5,990,649 | A | 11/1999 | Nagao et al. |

(56) References Cited

U.S. PATENT DOCUMENTS

| | | |
|---|---|---|
| 5,991,427 A | 11/1999 | Kakinami et al. |
| 6,005,611 A * | 12/1999 | Gullichsen ............ G06T 3/0018 |
| | | 348/143 |
| 6,009,336 A | 12/1999 | Harris et al. |
| 6,020,704 A | 2/2000 | Buschur |
| 6,031,484 A | 2/2000 | Bullinger et al. |
| 6,037,860 A | 3/2000 | Zander et al. |
| 6,037,975 A | 3/2000 | Aoyama |
| 6,049,171 A | 4/2000 | Stam et al. |
| 6,052,124 A | 4/2000 | Stein et al. |
| 6,057,754 A | 5/2000 | Kinoshita et al. |
| 6,066,933 A | 5/2000 | Ponziana |
| 6,084,519 A | 7/2000 | Coulling et al. |
| 6,091,833 A | 7/2000 | Yasui et al. |
| 6,097,023 A | 8/2000 | Schofield et al. |
| 6,097,024 A | 8/2000 | Stam et al. |
| 6,107,939 A | 8/2000 | Sorden |
| 6,144,022 A | 11/2000 | Tenenbaum et al. |
| 6,144,158 A | 11/2000 | Beam |
| 6,150,014 A | 11/2000 | Chu et al. |
| 6,150,930 A | 11/2000 | Cooper |
| 6,166,628 A | 12/2000 | Andreas |
| 6,175,300 B1 | 1/2001 | Kendrick |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,285,778 B1 | 9/2001 | Nakajima et al. |
| 6,291,906 B1 | 9/2001 | Marcus et al. |
| 6,292,752 B1 | 9/2001 | Franke et al. |
| 6,294,989 B1 | 9/2001 | Schofield et al. |
| 6,297,781 B1 | 10/2001 | Turnbull et al. |
| 6,302,545 B1 | 10/2001 | Schofield et al. |
| 6,310,611 B1 | 10/2001 | Caldwell |
| 6,311,119 B2 | 10/2001 | Sawamoto et al. |
| 6,313,454 B1 | 11/2001 | Bos et al. |
| 6,315,421 B1 | 11/2001 | Apfelbeck et al. |
| 6,317,057 B1 | 11/2001 | Lee |
| 6,318,870 B1 | 11/2001 | Spooner et al. |
| 6,320,176 B1 | 11/2001 | Schofield et al. |
| 6,320,282 B1 | 11/2001 | Caldwell |
| 6,324,450 B1 | 11/2001 | Iwama |
| 6,326,613 B1 | 12/2001 | Heslin et al. |
| 6,329,925 B1 | 12/2001 | Skiver et al. |
| 6,333,759 B1 | 12/2001 | Mazzilli |
| 6,341,523 B2 | 1/2002 | Lynam |
| 6,353,392 B1 | 3/2002 | Schofield et al. |
| 6,362,729 B1 | 3/2002 | Hellmann et al. |
| 6,366,236 B1 | 4/2002 | Farmer et al. |
| 6,370,329 B1 | 4/2002 | Teuchert |
| 6,388,565 B1 | 5/2002 | Bernhard et al. |
| 6,388,580 B1 | 5/2002 | Graham |
| 6,411,204 B1 | 6/2002 | Bloomfield et al. |
| 6,411,328 B1 | 6/2002 | Franke et al. |
| 6,429,594 B1 | 8/2002 | Stam et al. |
| 6,430,303 B1 | 8/2002 | Naoi et al. |
| 6,433,817 B1 | 8/2002 | Guerra |
| 6,441,748 B1 | 8/2002 | Takagi et al. |
| 6,442,465 B2 | 8/2002 | Breed et al. |
| 6,469,739 B1 | 10/2002 | Bechtel et al. |
| 6,472,979 B2 | 10/2002 | Schofield et al. |
| 6,477,464 B2 | 11/2002 | McCarthy et al. |
| 6,498,620 B2 * | 12/2002 | Schofield ................ B60N 2/002 |
| | | 348/118 |
| 6,513,252 B1 | 2/2003 | Schierbeek |
| 6,516,272 B2 | 2/2003 | Lin |
| 6,516,664 B2 | 2/2003 | Lynam |
| 6,523,964 B2 | 2/2003 | Schofield et al. |
| 6,534,884 B2 | 3/2003 | Marcus et al. |
| 6,539,306 B2 | 3/2003 | Turnbull |
| 6,540,193 B1 | 4/2003 | DeLine |
| 6,547,133 B1 | 4/2003 | Devries, Jr. et al. |
| 6,553,130 B1 | 4/2003 | Lemelson et al. |
| 6,559,435 B2 | 5/2003 | Schofield et al. |
| 6,570,998 B1 | 5/2003 | Ohtsuka et al. |
| 6,574,033 B1 | 6/2003 | Chui et al. |
| 6,578,017 B1 | 6/2003 | Ebersole et al. |
| 6,587,573 B1 | 7/2003 | Stam et al. |
| 6,589,625 B1 | 7/2003 | Kothari et al. |
| 6,593,565 B2 | 7/2003 | Heslin et al. |
| 6,593,698 B2 | 7/2003 | Stam et al. |
| 6,594,583 B2 | 7/2003 | Ogura et al. |
| 6,611,202 B2 | 8/2003 | Schofield et al. |
| 6,611,610 B1 | 8/2003 | Stam et al. |
| 6,627,918 B2 | 9/2003 | Getz et al. |
| 6,631,316 B2 | 10/2003 | Stam et al. |
| 6,631,994 B2 | 10/2003 | Suzuki et al. |
| 6,636,258 B2 | 10/2003 | Strumolo |
| 6,648,477 B2 | 11/2003 | Hutzel et al. |
| 6,650,233 B2 | 11/2003 | DeLine et al. |
| 6,650,455 B2 | 11/2003 | Miles |
| 6,672,731 B2 | 1/2004 | Schnell et al. |
| 6,674,562 B1 | 1/2004 | Miles |
| 6,678,056 B2 | 1/2004 | Downs |
| 6,678,614 B2 | 1/2004 | McCarthy et al. |
| 6,680,792 B2 | 1/2004 | Miles |
| 6,690,268 B2 | 2/2004 | Schofield et al. |
| 6,690,337 B1 * | 2/2004 | Mayer, III ............ G06F 1/1601 |
| | | 345/1.1 |
| 6,700,605 B1 | 3/2004 | Toyoda et al. |
| 6,703,925 B2 | 3/2004 | Steffel |
| 6,704,621 B1 | 3/2004 | Stein et al. |
| 6,710,908 B2 | 3/2004 | Miles et al. |
| 6,711,474 B1 | 3/2004 | Treyz et al. |
| 6,714,331 B2 | 3/2004 | Lewis et al. |
| 6,717,610 B1 | 4/2004 | Bos et al. |
| 6,728,393 B2 | 4/2004 | Stam et al. |
| 6,728,623 B2 | 4/2004 | Takenaga et al. |
| 6,735,506 B2 | 5/2004 | Breed et al. |
| 6,741,377 B2 | 5/2004 | Miles |
| 6,744,353 B2 | 6/2004 | Sjonell |
| 6,757,109 B2 | 6/2004 | Bos |
| 6,762,867 B2 | 7/2004 | Lippert et al. |
| 6,764,210 B2 | 7/2004 | Akiyama |
| 6,765,480 B2 | 7/2004 | Tseng |
| 6,784,828 B2 | 8/2004 | Delcheccolo et al. |
| 6,794,119 B2 | 9/2004 | Miles |
| 6,795,221 B1 | 9/2004 | Urey |
| 6,801,127 B2 | 10/2004 | Mizusawa et al. |
| 6,801,244 B2 | 10/2004 | Takeda et al. |
| 6,802,617 B2 | 10/2004 | Schofield et al. |
| 6,806,452 B2 | 10/2004 | Bos et al. |
| 6,807,287 B1 | 10/2004 | Hermans |
| 6,812,463 B2 | 11/2004 | Okada |
| 6,819,231 B2 | 11/2004 | Berberich et al. |
| 6,822,563 B2 | 11/2004 | Bos et al. |
| 6,823,241 B2 | 11/2004 | Shirato et al. |
| 6,823,261 B2 | 11/2004 | Sekiguchi |
| 6,824,281 B2 | 11/2004 | Schofield et al. |
| 6,831,261 B2 | 12/2004 | Schofield et al. |
| 6,838,980 B2 | 1/2005 | Gloger et al. |
| 6,842,189 B2 | 1/2005 | Park |
| 6,847,487 B2 | 1/2005 | Burgner |
| 6,859,148 B2 | 2/2005 | Miller et al. |
| 6,861,809 B2 | 3/2005 | Stam |
| 6,873,253 B2 | 3/2005 | Veziris |
| 6,882,287 B2 | 4/2005 | Schofield |
| 6,888,447 B2 | 5/2005 | Hori et al. |
| 6,891,563 B2 | 5/2005 | Schofield et al. |
| 6,898,518 B2 | 5/2005 | Padmanabhan |
| 6,906,620 B2 | 6/2005 | Nakai et al. |
| 6,906,639 B2 | 6/2005 | Lemelson et al. |
| 6,909,753 B2 | 6/2005 | Meehan et al. |
| 6,914,521 B2 | 7/2005 | Rothkop |
| 6,932,669 B2 | 8/2005 | Lee et al. |
| 6,933,837 B2 | 8/2005 | Gunderson et al. |
| 6,940,423 B2 | 9/2005 | Takagi et al. |
| 6,946,978 B2 | 9/2005 | Schofield |
| 6,950,035 B2 | 9/2005 | Tanaka et al. |
| 6,953,253 B2 | 10/2005 | Schofield et al. |
| 6,959,994 B2 | 11/2005 | Fujikawa et al. |
| 6,961,178 B2 | 11/2005 | Sugino et al. |
| 6,961,661 B2 | 11/2005 | Sekiguchi |
| 6,967,569 B2 | 11/2005 | Weber et al. |
| 6,968,736 B2 | 11/2005 | Lynam |

(56) References Cited

U.S. PATENT DOCUMENTS

| | | | |
|---|---|---|---|
| 6,975,775 B2 | 12/2005 | Rykowski et al. | |
| 6,989,736 B2 | 1/2006 | Berberich et al. | |
| 6,995,687 B2 | 2/2006 | Lang et al. | |
| 7,004,593 B2 | 2/2006 | Weller et al. | |
| 7,004,606 B2 | 2/2006 | Schofield | |
| 7,005,974 B2 | 2/2006 | McMahon et al. | |
| 7,012,727 B2 | 3/2006 | Hutzel et al. | |
| 7,023,331 B2 | 4/2006 | Kodama | |
| 7,030,738 B2 | 4/2006 | Ishii | |
| 7,030,775 B2 | 4/2006 | Sekiguchi | |
| 7,038,577 B2 | 5/2006 | Pawlicki et al. | |
| 7,046,448 B2 | 5/2006 | Burgner | |
| 7,057,505 B2 | 6/2006 | Iwamoto | |
| 7,057,681 B2 | 6/2006 | Hinata et al. | |
| 7,062,300 B1 | 6/2006 | Kim | |
| 7,065,432 B2 | 6/2006 | Moisel et al. | |
| 7,068,289 B2 | 6/2006 | Satoh et al. | |
| 7,080,326 B2* | 7/2006 | Molander | G06F 3/0481 715/788 |
| 7,085,633 B2 | 8/2006 | Nishira et al. | |
| 7,085,637 B2 | 8/2006 | Breed et al. | |
| 7,092,548 B2 | 8/2006 | Laumeyer et al. | |
| 7,095,432 B2 | 8/2006 | Nakayama et al. | |
| 7,106,213 B2 | 9/2006 | White | |
| 7,110,021 B2 | 9/2006 | Nobori et al. | |
| 7,110,156 B2 | 9/2006 | Lawlor et al. | |
| 7,113,867 B1 | 9/2006 | Stein | |
| 7,116,246 B2 | 10/2006 | Winter et al. | |
| 7,121,028 B2 | 10/2006 | Shoen et al. | |
| 7,123,168 B2 | 10/2006 | Schofield | |
| 7,133,661 B2 | 11/2006 | Hatae et al. | |
| 7,149,613 B2 | 12/2006 | Stam et al. | |
| 7,151,996 B2 | 12/2006 | Stein | |
| 7,167,796 B2 | 1/2007 | Taylor et al. | |
| 7,187,498 B2 | 3/2007 | Bengoechea et al. | |
| 7,195,381 B2 | 3/2007 | Lynam et al. | |
| 7,202,776 B2 | 4/2007 | Breed | |
| 7,202,987 B2 | 4/2007 | Varaprasad et al. | |
| 7,205,904 B2 | 4/2007 | Schofield | |
| 7,221,363 B2 | 5/2007 | Roberts et al. | |
| 7,224,324 B2 | 5/2007 | Quist et al. | |
| 7,227,459 B2 | 6/2007 | Bos et al. | |
| 7,227,611 B2 | 6/2007 | Hull et al. | |
| 7,235,918 B2 | 6/2007 | McCullough et al. | |
| 7,248,283 B2 | 7/2007 | Takagi et al. | |
| 7,249,860 B2 | 7/2007 | Kulas et al. | |
| 7,253,723 B2 | 8/2007 | Lindahl et al. | |
| 7,255,451 B2 | 8/2007 | McCabe et al. | |
| 7,271,951 B2 | 9/2007 | Weber et al. | |
| 7,304,661 B2 | 12/2007 | Ishikura | |
| 7,311,406 B2 | 12/2007 | Schofield et al. | |
| 7,325,934 B2 | 2/2008 | Schofield et al. | |
| 7,325,935 B2 | 2/2008 | Schofield et al. | |
| 7,337,055 B2 | 2/2008 | Matsumoto et al. | |
| 7,338,177 B2 | 3/2008 | Lynam | |
| 7,339,149 B1 | 3/2008 | Schofield et al. | |
| 7,344,261 B2 | 3/2008 | Schofield et al. | |
| 7,355,524 B2 | 4/2008 | Schofield | |
| 7,360,932 B2 | 4/2008 | Uken et al. | |
| 7,370,983 B2 | 5/2008 | DeWind et al. | |
| 7,375,803 B1 | 5/2008 | Bamji | |
| 7,380,948 B2 | 6/2008 | Schofield et al. | |
| 7,388,182 B2 | 6/2008 | Schofield et al. | |
| 7,402,786 B2 | 7/2008 | Schofield et al. | |
| 7,420,756 B2 | 9/2008 | Lynam | |
| 7,423,248 B2 | 9/2008 | Schofield et al. | |
| 7,423,821 B2 | 9/2008 | Bechtel et al. | |
| 7,425,076 B2 | 9/2008 | Schofield et al. | |
| 7,429,998 B2 | 9/2008 | Kawauchi et al. | |
| 7,432,967 B2 | 10/2008 | Bechtel et al. | |
| 7,446,924 B2 | 11/2008 | Schofield et al. | |
| 7,459,664 B2 | 12/2008 | Schofield et al. | |
| 7,460,007 B2 | 12/2008 | Schofield et al. | |
| 7,474,963 B2 | 1/2009 | Taylor et al. | |
| 7,489,374 B2 | 2/2009 | Utsumi et al. | |
| 7,495,719 B2 | 2/2009 | Adachi et al. | |
| 7,525,604 B2 | 4/2009 | Xue | |
| 7,526,103 B2 | 4/2009 | Schofield et al. | |
| 7,541,743 B2 | 6/2009 | Salmeen et al. | |
| 7,543,946 B2 | 6/2009 | Ockerse et al. | |
| 7,545,429 B2 | 6/2009 | Travis | |
| 7,548,291 B2 | 6/2009 | Lee et al. | |
| 7,551,103 B2 | 6/2009 | Schofield | |
| 7,561,181 B2 | 7/2009 | Schofield et al. | |
| 7,565,006 B2 | 7/2009 | Stam et al. | |
| 7,566,851 B2 | 7/2009 | Stein et al. | |
| 7,567,291 B2 | 7/2009 | Bechtel et al. | |
| 7,605,856 B2 | 10/2009 | Imoto | |
| 7,613,327 B2 | 11/2009 | Stam et al. | |
| 7,616,781 B2 | 11/2009 | Schofield et al. | |
| 7,619,508 B2 | 11/2009 | Lynam et al. | |
| 7,629,996 B2 | 12/2009 | Rademacher et al. | |
| 7,633,383 B2 | 12/2009 | Dunsmoir et al. | |
| 7,639,149 B2 | 12/2009 | Katoh | |
| 7,653,215 B2 | 1/2010 | Stam | |
| 7,655,894 B2 | 2/2010 | Schofield et al. | |
| 7,663,798 B2 | 2/2010 | Tonar et al. | |
| 7,676,087 B2 | 3/2010 | Dhua et al. | |
| 7,720,580 B2 | 5/2010 | Higgins-Luthman | |
| 7,724,434 B2 | 5/2010 | Cross et al. | |
| 7,731,403 B2 | 6/2010 | Lynam et al. | |
| 7,742,864 B2 | 6/2010 | Sekiguchi | |
| 7,786,898 B2 | 8/2010 | Stein et al. | |
| 7,791,694 B2 | 9/2010 | Molsen et al. | |
| 7,792,329 B2 | 9/2010 | Schofield et al. | |
| 7,842,154 B2 | 11/2010 | Lynam | |
| 7,843,451 B2 | 11/2010 | Lafon | |
| 7,854,514 B2 | 12/2010 | Conner et al. | |
| 7,855,755 B2 | 12/2010 | Weller et al. | |
| 7,855,778 B2 | 12/2010 | Yung et al. | |
| 7,859,565 B2 | 12/2010 | Schofield et al. | |
| 7,877,175 B2 | 1/2011 | Higgins-Luthman | |
| 7,881,496 B2 | 2/2011 | Camilleri et al. | |
| 7,903,324 B2 | 3/2011 | Kobayashi et al. | |
| 7,903,335 B2 | 3/2011 | Nieuwkerk et al. | |
| 7,914,187 B2 | 3/2011 | Higgins-Luthman et al. | |
| 7,930,160 B1 | 4/2011 | Hosagrahara et al. | |
| 7,949,152 B2 | 5/2011 | Schofield et al. | |
| 7,965,357 B2 | 6/2011 | Van De Witte et al. | |
| 7,991,522 B2 | 8/2011 | Higgins-Luthman | |
| 7,994,462 B2 | 8/2011 | Schofield et al. | |
| 8,017,898 B2 | 9/2011 | Lu et al. | |
| 8,027,691 B2 | 9/2011 | Bernas et al. | |
| 8,044,776 B2* | 10/2011 | Schofield | B60Q 3/258 340/425.5 |
| 8,064,643 B2 | 11/2011 | Stein et al. | |
| 8,082,101 B2 | 12/2011 | Stein et al. | |
| 8,090,153 B2 | 1/2012 | Schofield et al. | |
| 8,095,310 B2 | 1/2012 | Taylor et al. | |
| 8,098,142 B2 | 1/2012 | Schofield et al. | |
| 8,120,652 B2 | 2/2012 | Bechtel et al. | |
| 8,164,628 B2 | 4/2012 | Stein et al. | |
| 8,184,159 B2 | 5/2012 | Luo | |
| 8,203,440 B2 | 6/2012 | Schofield et al. | |
| 8,222,588 B2 | 7/2012 | Schofield et al. | |
| 8,224,031 B2 | 7/2012 | Saito | |
| 8,233,045 B2 | 7/2012 | Luo et al. | |
| 8,254,635 B2 | 8/2012 | Stein et al. | |
| 8,289,430 B2 | 10/2012 | Bechtel et al. | |
| 8,305,471 B2 | 11/2012 | Bechtel et al. | |
| 8,308,325 B2 | 11/2012 | Takayanagi et al. | |
| 8,314,689 B2 | 11/2012 | Schofield et al. | |
| 8,324,552 B2 | 12/2012 | Schofield et al. | |
| 8,339,526 B2 | 12/2012 | Minikey, Jr. et al. | |
| 8,378,851 B2 | 2/2013 | Stein et al. | |
| 8,386,114 B2 | 2/2013 | Higgins-Luthman | |
| 8,405,726 B2 | 3/2013 | Schofield et al. | |
| 8,452,055 B2 | 5/2013 | Stein et al. | |
| 8,553,088 B2 | 10/2013 | Stein et al. | |
| 10,457,209 B2 | 10/2019 | Byrne et al. | |
| 2002/0005778 A1 | 1/2002 | Breed et al. | |
| 2002/0029103 A1 | 3/2002 | Breed et al. | |
| 2002/0113873 A1 | 8/2002 | Williams | |
| 2002/0116106 A1 | 8/2002 | Breed et al. | |

(56) References Cited

U.S. PATENT DOCUMENTS

| | | |
|---|---|---|
| 2003/0035050 A1* | 2/2003 | Mizusawa ............... G06T 15/10 348/148 |
| 2003/0103142 A1 | 6/2003 | Hitomi et al. |
| 2003/0125855 A1 | 7/2003 | Breed et al. |
| 2003/0137586 A1 | 7/2003 | Lewellen |
| 2003/0209893 A1 | 11/2003 | Breed et al. |
| 2003/0222982 A1 | 12/2003 | Hamden et al. |
| 2004/0164228 A1 | 8/2004 | Fogg et al. |
| 2004/0179099 A1* | 9/2004 | Bos ........................... B60R 1/00 348/148 |
| 2004/0200948 A1 | 10/2004 | Bos et al. |
| 2005/0073853 A1 | 4/2005 | Stam |
| 2005/0131607 A1 | 6/2005 | Breed |
| 2005/0219852 A1 | 10/2005 | Stam et al. |
| 2005/0237385 A1 | 10/2005 | Kosaka et al. |
| 2006/0017807 A1* | 1/2006 | Lee ........................... B60R 1/00 348/36 |
| 2006/0018511 A1 | 1/2006 | Stam et al. |
| 2006/0018512 A1 | 1/2006 | Stam et al. |
| 2006/0050018 A1 | 3/2006 | Hutzel et al. |
| 2006/0091813 A1 | 5/2006 | Stam et al. |
| 2006/0103727 A1 | 5/2006 | Tseng |
| 2006/0244829 A1* | 11/2006 | Kato ..................... H04N 5/2624 348/148 |
| 2006/0250501 A1 | 11/2006 | Widmann et al. |
| 2007/0024724 A1 | 2/2007 | Stein et al. |
| 2007/0104476 A1 | 5/2007 | Yasutomi et al. |
| 2007/0109406 A1 | 5/2007 | Schofield et al. |
| 2007/0120657 A1 | 5/2007 | Schofield et al. |
| 2007/0154063 A1 | 7/2007 | Breed |
| 2007/0193811 A1 | 8/2007 | Breed et al. |
| 2007/0242339 A1 | 10/2007 | Bradley |
| 2008/0043099 A1 | 2/2008 | Stein et al. |
| 2008/0147321 A1 | 6/2008 | Howard et al. |
| 2008/0192132 A1 | 8/2008 | Bechtel et al. |
| 2008/0231710 A1* | 9/2008 | Asari ................... H04N 17/002 348/187 |
| 2008/0234899 A1 | 9/2008 | Breed et al. |
| 2008/0266396 A1 | 10/2008 | Stein |
| 2009/0052003 A1 | 2/2009 | Schofield et al. |
| 2009/0066065 A1 | 3/2009 | Breed et al. |
| 2009/0079585 A1* | 3/2009 | Chinomi ................... B60R 1/04 340/901 |
| 2009/0113509 A1 | 4/2009 | Tseng et al. |
| 2009/0160987 A1 | 6/2009 | Bechtel et al. |
| 2009/0190015 A1 | 7/2009 | Bechtel et al. |
| 2009/0201137 A1 | 8/2009 | Weller et al. |
| 2009/0243824 A1 | 10/2009 | Peterson et al. |
| 2009/0256938 A1 | 10/2009 | Bechtel et al. |
| 2011/0032422 A1* | 2/2011 | Yamamoto ............ G06T 3/4053 348/500 |
| 2012/0045112 A1 | 2/2012 | Lundblad et al. |
| 2012/0069185 A1 | 3/2012 | Stein |
| 2012/0154591 A1 | 6/2012 | Baur et al. |
| 2012/0200707 A1 | 8/2012 | Stein et al. |
| 2012/0314071 A1 | 12/2012 | Rosenbaum et al. |
| 2013/0027558 A1 | 1/2013 | Ramanath et al. |
| 2013/0141580 A1 | 6/2013 | Stein et al. |
| 2013/0147957 A1 | 6/2013 | Stein |
| 2013/0286193 A1* | 10/2013 | Pflug ........................ B60R 1/00 348/135 |
| 2014/0055616 A1* | 2/2014 | Corcoran ............... H04N 5/247 348/148 |

FOREIGN PATENT DOCUMENTS

| | | | |
|---|---|---|---|
| EP | 1115250 A1 | 7/2001 | |
| JP | 59114139 | 7/1984 | |
| JP | 6080953 | 5/1985 | |
| JP | 6079889 | 10/1986 | |
| JP | S6216073 | 4/1987 | |
| JP | 6272245 | 5/1987 | |
| JP | S62131837 A | 6/1987 | |
| JP | 6414700 | 1/1989 | |
| JP | H1168538 A | 7/1989 | |
| JP | 03099952 | 4/1991 | |
| JP | 4114587 B2 | 4/1992 | |
| JP | H04127280 A | 4/1992 | |
| JP | 0577657 | 3/1993 | |
| JP | 5213113 | 8/1993 | |
| JP | 6227318 B2 | 8/1994 | |
| JP | 07105496 | 4/1995 | |
| JP | 2630604 | 7/1997 | |
| JP | 200274339 A | 3/2002 | |
| JP | 2003083742 A | 3/2003 | |
| JP | 20041658 A | 1/2004 | |
| WO | 2011014497 A1 | 2/2011 | |
| WO | WO-2011014497 A1 * | 2/2011 | ............ G08G 1/168 |
| WO | 2013126715 A2 | 8/2013 | |

OTHER PUBLICATIONS

Broggi et al., "Multi-Resolution Vehicle Detection using Artificial Vision," IEEE Intelligent Vehicles Symposium of Jun. 2004.

Sun et al., "On-road vehicle detection using optical sensors: a review".

Tokimaru et al., "CMOS Rear-View TV System with CCD Camera", National Technical Report vol. 34, No. 3, pp. 329-336, Jun. 1988 (Japan).

Vellacott, Oliver, "CMOS in Camera," IEE Review, pp. 111-114 (May 1994).

Wang et al., CMOS Video Cameras, article, 1991, 4 pages, University of Edinburgh, UK.

Zheng et al., "An Adaptive System for Traffic Sign Recognition," IEEE Proceedings of the Intelligent Vehicles '94 Symposium, pp. 165-170 (Oct. 1994).

\* cited by examiner

Curved Image

Curved Image – objects in side regions enlarged

VEHICULAR DISPLAY SYSTEM WITH MULTI-PANED IMAGE DISPLAY

CROSS REFERENCE TO RELATED APPLICATIONS

The present application is a continuation of U.S. patent application Ser. No. 13/852,190, filed Mar. 28, 2013, now U.S. Pat. No. 10,457,209, which claims the filing benefit of U.S. provisional applications, Ser. No. 61/745,864, filed Dec. 26, 2012, Ser. No. 61/700,617, filed Sep. 13, 2012, and Ser. No. 61/616,855, filed Mar. 28, 2012, which are hereby incorporated herein by reference in their entireties. U.S. patent application Ser. No. 13/852,190 is also a continuation-in-part of PCT Application No. PCT/US2013/027342, filed Feb. 22, 2013, which claims the filing benefit of U.S. provisional application Ser. No. 61/601,669, filed Feb. 22, 2012, which are hereby incorporated herein by reference in their entireties.

FIELD OF THE INVENTION

The present invention relates generally to cameras and displays and, more particularly, to a vehicle vision system.

BACKGROUND OF THE INVENTION

Vehicle vision systems can provide vehicle operators with valuable information about driving conditions. For example, a typical vehicle vision system can aid a driver in parking his or her automobile by alerting the driver to hazards around the automobile that should be avoided. Other uses for vehicle vision systems are also known.

However, a typical vehicle camera or vision system may not be able to provide video that is quickly and reliably comprehensible to the driver.

SUMMARY OF THE INVENTION

A vehicle vision or camera system performs dewarping on captured images and outputs dewarped images separated into three image panes. Two side image panes are shaped and arranged with respect to a central image pane to provide the vehicle operator with a view of outside the vehicle that is readily comprehensible. For example, the side panes may each comprise a parallelogram shape, with their respective upper and lower edges being non-parallel to the upper and lower edges of the central image pane (which may be rectangular shaped with its upper and lower edges generally parallel and horizontal when the image is displayed at the display). The upper and lower edges of the side image panes may be parallel and may slope downwardly or upwardly away from the central image pane, or the upper and lower edges of the side image panes may taper towards one another or diverge away from one another away from the central image pane. When the image is displayed at the display, each of the side image panes may be arranged with respect to the central image pane to appear folded with respect to the central image pane.

These and other objects, advantages, purposes and features of the present invention will become apparent upon review of the following specification in conjunction with the drawings.

BRIEF DESCRIPTION OF THE DRAWINGS

The drawings illustrate, by way of example only, embodiments of the present disclosure.

FIG. 12 is a diagram of a dewarped image similar to FIG. 11, shown with the road outline overlay filled in;

DESCRIPTION OF THE PREFERRED EMBODIMENTS

Figure 1:
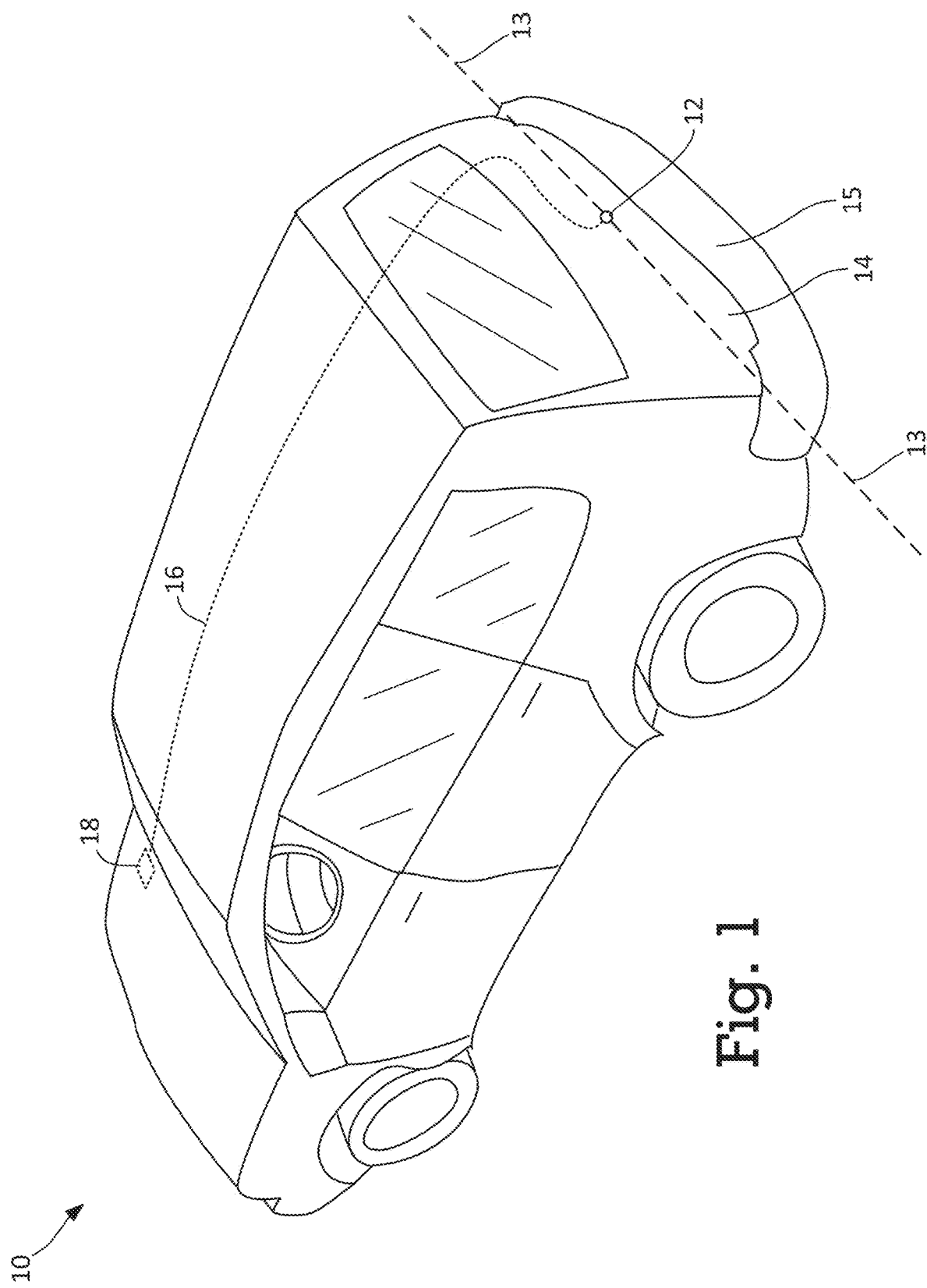
FIG. 1 is a perspective view of a vehicle having a vehicle vision system.

With reference to FIG. 1, a vehicle 10, such as a car, truck, van, bus, or other type of vehicle, includes a camera 12. The camera 12 is configured to be positioned on the vehicle 10 to face away from the bulk of the body 14 of the vehicle 10 so as to have an exterior field of view, whereby the camera is operable to capture video images of the environment outside of the vehicle 10 to, for example, aid the operator of the vehicle 10.

In this example, the camera 12 is positioned at a rear-portion of the body 14 of the vehicle 10 and is rearward-facing to capture video images of the environment behind the vehicle 10. The camera 12 may also be angled downward towards the road by a selected angle. In another example, the camera 12 may be positioned at a rear bumper 15 of the vehicle 10. In still other examples, the camera 12 may be forward-facing and may be positioned, for example, at the grille of the vehicle 10 or elsewhere at a forward portion of the vehicle.

The camera 12 may include a wide-angle lens (such as shown at 32 of FIG. 2), such as a lens with about a 180-degree or more horizontal field of view or other suitable wide-angle lens. Such a lens may comprise one or more spherical type lenses or lens optics or elements and/or aspheric lenses or lens optics or elements or the like. In this way, the camera 12 is operable to capture images of the environment behind or ahead of the vehicle 10, including portions of the roadway immediately behind or in front of the vehicle, as well as areas to the right and left of the vehicle 10. When the camera 12 is rearward-facing and has a wide-angle lens, such as a 180-degree lens or the like, the horizontal extents of the field of view of the camera 12 are shown at 13 in FIG. 1. Such a field of view allows the camera to capture images of a wide range of potential hazards including objects directly in the vehicle's rear path of travel, objects in rear blind spots, as well as objects at a distance to the far left and far right of the vehicle 10, such as an approaching vehicle on a perpendicular path of travel to the vehicle 10 (such as at a cross road that the vehicle is at or approaching or such as at an aisle of a parking lot when the vehicle is pulling out of a parking space). A similar field of view may be established in embodiments wherein the camera 12 is forward-facing.

The camera 12 may comprise a charge-coupled device (CCD) image sensor, a complementary metal-oxide-semiconductor (CMOS) image sensor, or any other suitable type of image sensor. For example, the camera and/or imaging device and/or control and/or image processor may comprise any suitable components, and may utilize aspects of the cameras and vision systems described in U.S. Pat. Nos. 7,965,336; 7,937,667; 7,720,580; 7,480,149; 7,339,149; 7,123,168; 7,005,974; 7,004,606; 7,038,577; 6,946,978; 6,922,292; 6,831,261; 6,822,563; 6,806,452; 6,757,109; 6,717,610; 6,824,281; 6,806,452; 6,690,268; 6,590,719; 6,559,435; 6,498,620; 6,396,397; 6,353,392; 6,320,176; 6,313,454; 6,201,642; 6,097,023; 5,877,897; 5,796,094; 5,760,962; 5,715,093; 5,670,935 and/or 5,550,677, and/or International Publication No. WO 2010/099416, published Sep. 2, 2010, and/or PCT Application No. PCT/US10/47256, filed Aug. 31, 2010 and published Mar. 10, 2011 as International Publication No. WO 2011/028686, and/or PCT Application No. PCT/US2008/076022, filed Sep. 11, 2008 and published Mar. 19, 2009 as International Publication No. WO 2009/036176, and/or PCT Application No. PCT/US2008/078700, filed Oct. 3, 2008 and published Apr. 9, 2009 as International Publication No. WO 2009/046268, and/or PCT Application No. PCT/US2012/048110, filed Jul. 25, 2012, and published on Jan. 31, 2013 as International Publication No. WO 2013/016409, and/or U.S. patent application Ser. No. 13/534,657, filed Jun. 27, 2012, and published on Jan. 3, 2013 as U.S. Publication No. US-2013-0002873; Ser. No. 12/508,840, filed Jul. 24, 2009, and published on Jan. 28, 2010 as U.S. Publication No. US-2010-0020170; Ser. No. 12/091,359, filed Apr. 24, 2008 and published Oct. 1, 2009 as U.S. Publication No. US-2009-0244361; Ser. No. 12/508,840, filed Jul. 24, 2009, and published Jan. 28, 2010 as U.S. Pat. Publication No. US 2010-0020170; and/or Ser. No. 13/260,400, filed Sep. 26, 2011, now U.S. Pat. No. 8,542,451, which are hereby incorporated herein by reference in their entireties.

The camera 12 is coupled via a line or link 16 (such as, for example, conductive wires or the like, or a communication bus, such as a LVDS or an Ethernet bus or the like) to a processing system 18 which may be located at a forward portion of the vehicle 10, such as under the hood or below the dashboard. In other examples, the camera 12 can be coupled to the processing system 18 via a wireless communications technique instead of via the line 16. Moreover, the processing system 18 can be positioned elsewhere in the vehicle 10. The camera 12 and processing unit 18 may also comprise components or parts of a single camera module or housing, with the image capturing device and image processing units are integrated together. Such an integrated unit may provide a simpler and lower cost camera product.

Figure 2:
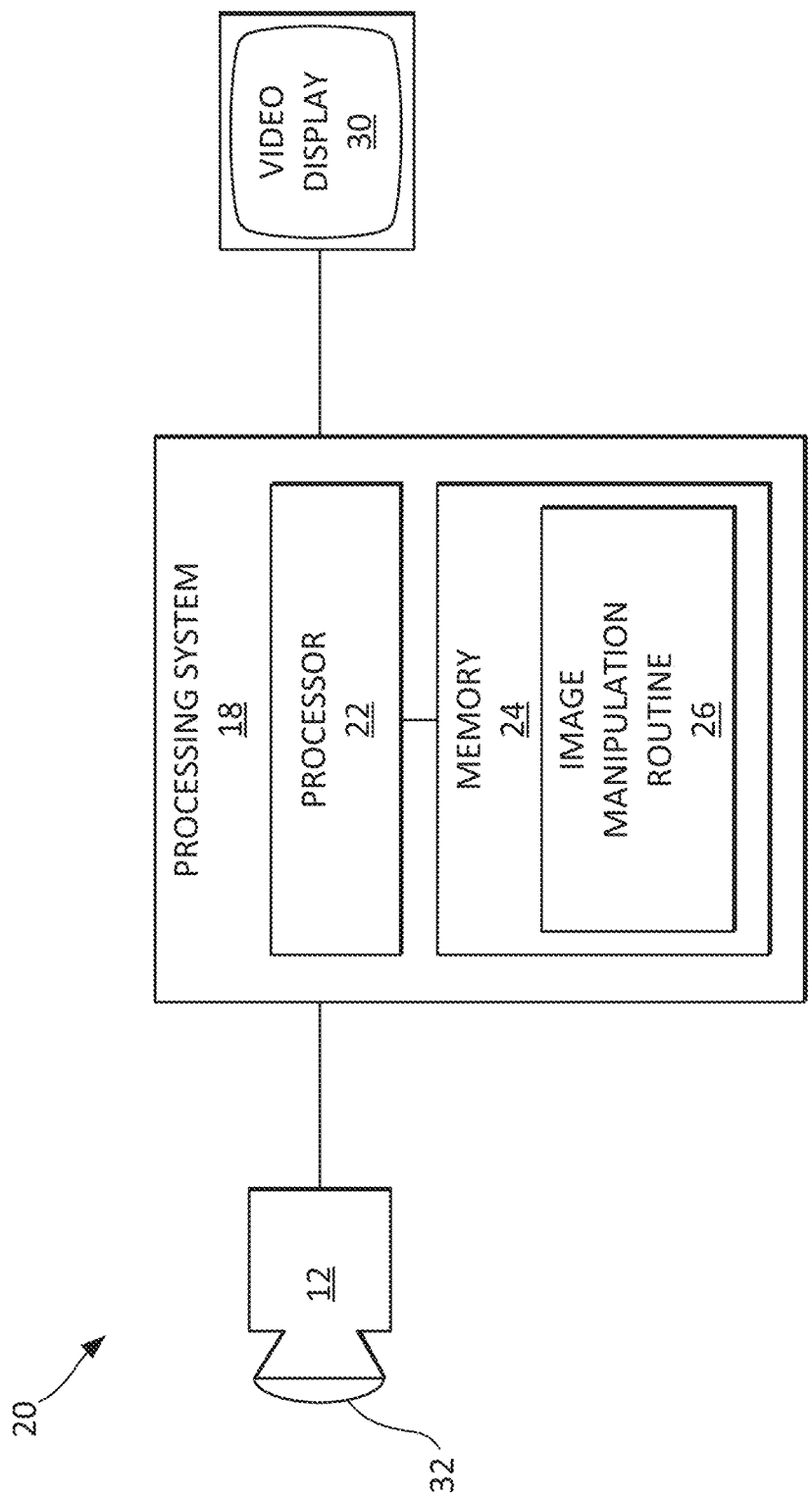
FIG. 2 is a functional block diagram of the vehicle vision system.

As shown in FIG. 2, the camera 12 and processing system 18 can form at least part of a vehicle vision system or camera system 20.

The processing system 18 includes a processor 22 and connected memory 24. The processing system 18 is operatively coupled to both the camera 12, as mentioned above, and to a display 30.

The display 30 is configured to be positioned inside the cabin of the vehicle 10. The display 30 is coupled to the processing system 18 by way of, for example, conductive lines. The display 30 can include an in-vehicle display panel situated in the dashboard of the vehicle 10. The display 30 may comprise a backlit liquid-crystal display (LCD) panel, a light-emitting diode (LED) display panel, an organic LED (OLED) display panel, an active-matrix organic LED (AMOLED) display panel, or the like, as well as a circuit to drive the display panel with a video signal received from the processing system 18. The display 30 may include a touch-screen interface to control how the video is displayed by, for example, outputting a mode signal to the processing system 18.

The display may, for example, utilize aspects of the video displays (that may be disposed at a vehicle console or instrument panel or at an interior rearview mirror assembly of the vehicle) described in U.S. Pat. Nos. 6,690,268; 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252; 6,642,851; 5,530,240; 6,329,925; 7,855,755; 7,626,749; 7,581,859; 7,446,924; 7,446,650; 7,370,983; 7,338,177; 7,274,501; 7,255,451; 7,195,381; 7,184,190; 5,668,663 and/or 5,724,187, and/or U.S. patent application Ser. No. 13/333,337, filed Dec. 21, 2011, now U.S. Pat. No. 9,264,672, and/or U.S. patent application Ser. No. 11/226,628, filed Sep. 14, 2005 and published Mar. 23, 2006 as U.S. Publication No. US-2006-0061008, and/or Ser. No. 10/538,724, filed Jun. 13, 2005 and published Mar. 9, 2006 as U.S. Publication No. US-2006-0050018, which are all hereby incorporated herein by reference in their entireties.

The processing system 18 is configured to receive from the camera 12 image data representative of an image captured by the camera 12, manipulate the received image data, and then output a processed image to the display 30. The processing system 18 may be configured to perform these steps on a continuous basis so as to continuously update the image shown on the display 30, to aid the driver in operating the vehicle 10. In embodiments wherein the camera 12 is rear-facing, such a system can assist the driver to safely back the vehicle 10 up, perhaps out of a parking spot in a parking lot in which there may be vehicular cross-traffic. In embodiments wherein the camera 12 is front-facing, such a system can assist the driver to safely enter an intersection where a view of potential cross-traffic is obscured by buildings or parked vehicles. The processing system may utilize aspects of the systems described in PCT Application No. PCT/US2013/027342, filed Feb. 22, 2013, and published on Aug. 9, 2013 as International Publication No. WO 2013/126715, which is hereby incorporated herein by reference in its entirety.

Image data as discussed herein may be a series of pixel color values of an image, a compressed stream of pixel color values, pixel color values of an image differentially encoded with respect to a previous image (such as, for example, an MPEG video P-frame or B-frame that refers back to a previous frame, such as an I-frame), or the like. Irrespective of the form of the image data, the processing system 18 can be considered to have received an image and to have access to all the pixels of the image for the purposes of image processing.

The processing system 18 can include one or more image processors which may be located together or in separate locations. One or more image processors may, for example, be located at a controller (such as, for example, an engine control unit (ECU) or a vehicle control unit (VCU) or the like) of the vehicle 10 or elsewhere, such as at the camera 12. One processor 22 is depicted at the processing system 18 for sake of convenience. In one example, the processing system 18 includes a processor at the camera 12 and another processor at the controller, with each of the processors performing different kinds of processing. For example, the processor at the camera 12 may perform noise compensation, while the processor at the controller may perform dewarping or other image manipulation. In another example, a single processor is provided at the controller or at the camera 12. In any of these examples, a processor can be a single-core processor, a multi-core processor, a microprocessor, a graphics processing unit (GPU), a central processing unit (CPU), or the like.

The memory 24 can be located and distributed in a similar manner as the processor or processors described above. The memory 24 can store program code, such as an image manipulation routine 26. The processor 22 can execute program code stored in the memory 24. As will be discussed in detail below, the processor 22 can be configured by the image manipulation routine 26 to process an image received from the camera 12 to generate a dewarped image having three panes, as will be discussed in detail below.

Figure 3:
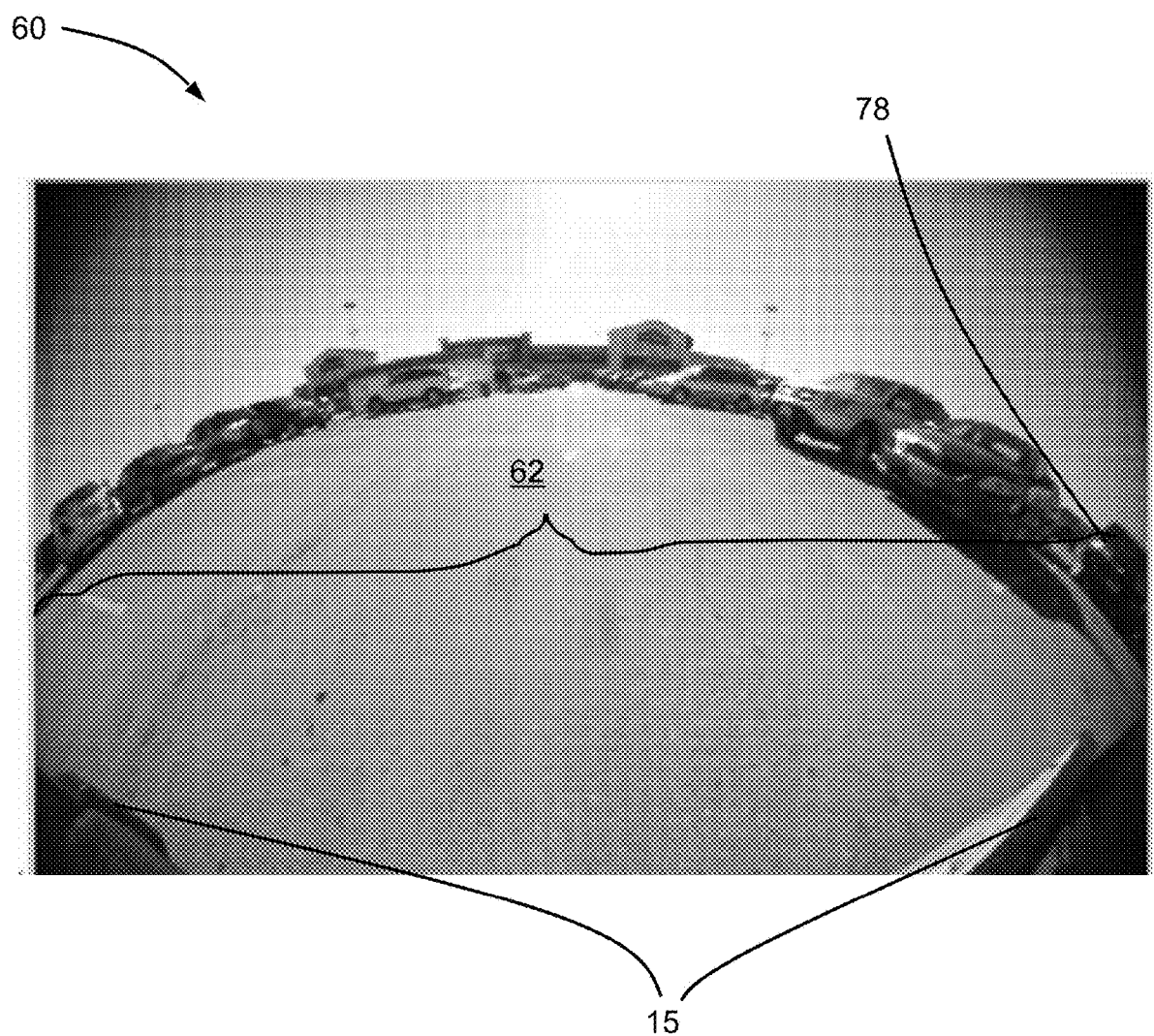
FIG. 3 is a diagram of an original image captured by the vehicle camera.

FIG. 3 shows an example of an image 60 captured by the camera 12 using the wide-angle lens 32. Warping in the image 60 resulting from the wide-angled lens 32 can be seen. In the example scene, a parking lot lane 62 is perpendicular to the vehicle 10. An approaching vehicle 78 traveling in that laneway 62 presents a potential collision hazard to the vehicle 10. Portions of the vehicle body 14 and bumper 15 can be seen to be distorted.

Figure 4:
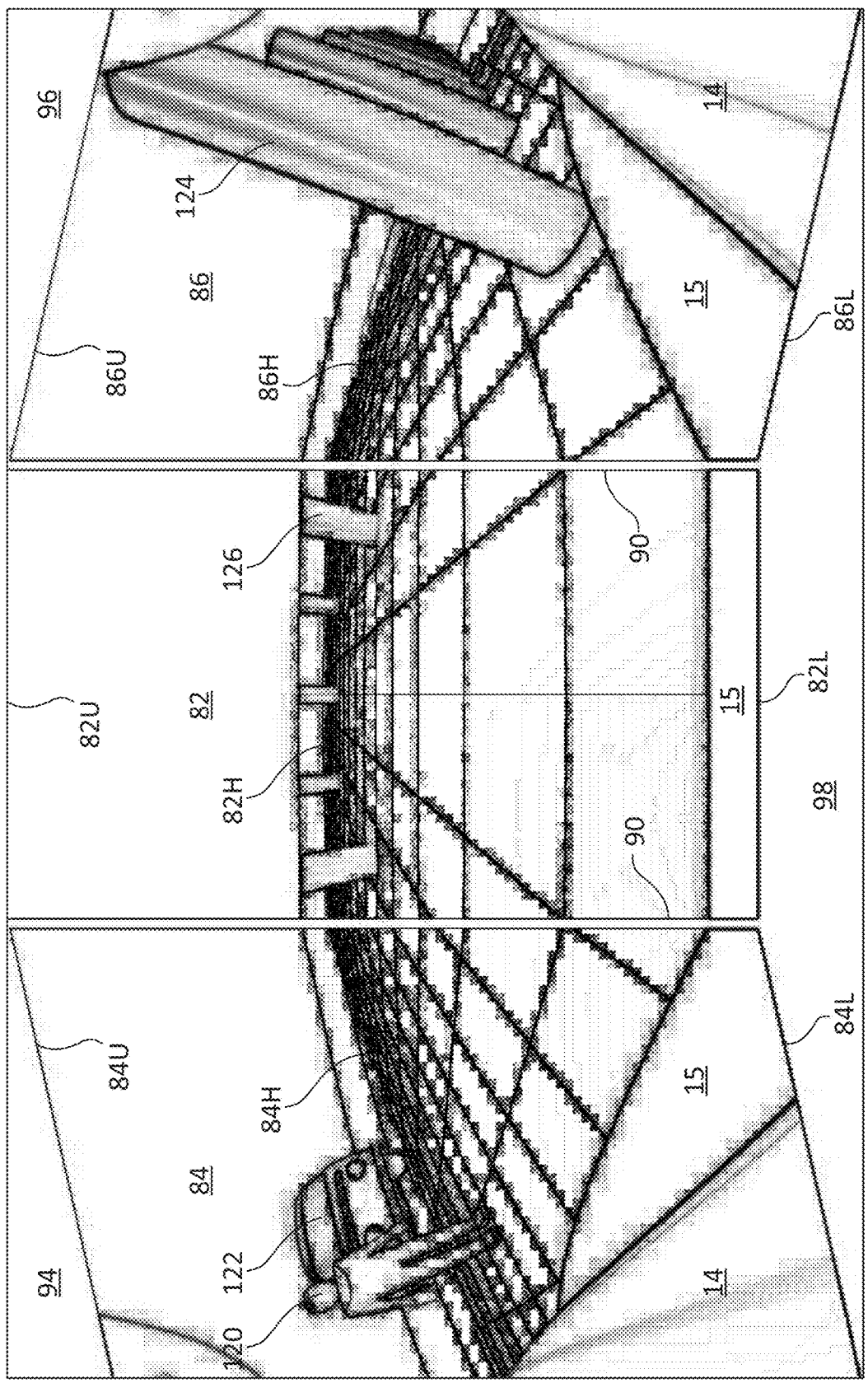
FIG. 4 is a diagram of a dewarped image having three panes as generated by the vehicle vision system.

As will now be discussed in detail with reference to FIG. 4, the vehicle vision system 20 can process images (such as, for example, image 60 of FIG. 3) captured by the camera 12 to generate more informative, processed images and output such to the display 30. This can be performed by the image manipulation routine 26 acting on image data received from the camera 12. Illustrated in FIG. 4, is an example processed image 80 as it would be displayed on the display 30. It will be noted that the environment captured in the image of FIG. 4 is different from the environment captured in the image of FIG. 3, however these images are merely exemplary and are intended only to illustrate the particular point being made in relation to each figure.

The image manipulation routine 26 performs dewarping to obtain the image 80. Such dewarping flattens images received from the camera 12 to reduce the apparent curvature resulting from optical distortion causes by the wide-angle lens 32. The image manipulation routine 26 can also be configured to perform a perspective adjustment to the image (in other words, to show the environment as it would appear if the camera 12 were positioned or oriented differently than it is). In the example embodiment shown, the perspective adjustment carried out by the image manipulation routine 26 shows the environment as it would appear if the camera 12 were oriented horizontally (or generally parallel to the ground). The image manipulation routine 26 can perform other types of image manipulation, such as reshaping one or more portions of the image by one or more of enlarging, moving, cropping, stretching, compressing, skewing, rotating, and tilting, for example.

The image manipulation routine 26 separates the dewarped image 80 into three image panes 82, 84, 86. The three image panes include a rectangular central image pane 82 derived from a first subset of captured image data and two side image panes 84, 86 derived from second and third subsets of captured image data. The three image panes 82, 84, 86 may be of approximately the same width, such that the displayed image 80 is approximately divided into thirds. The portions of the displayed image 80 shown in the side image panes 84, 86 are more warped than the portion shown in the central image pane 82.

In the illustrated embodiment of FIG. 4, the left-side image pane 84 has an upper edge 84U and a lower edge 84L that are generally parallel to each other and slope generally downwardly away from the central image pane 82. Similarly, the right-side image pane 86 has an upper edge 86U and a lower edge 86L that are generally parallel to each other and slope generally downwardly away from the central image pane 82. The terms left and right are relative to the direction that the camera 12 is pointing. The side image panes 84, 86 can be shaped generally as parallelograms. As can be seen, the two side image panes 84, 86 are shaped and arranged with respect to the central image pane 82 to appear folded at some angle with respect to the central image pane 82, (so as to give the appearance of three panels of a bay window), as it would appear from a raised perspective or viewpoint.

This folded effect of the displayed image 80 can give the operator of the vehicle 10 a better understanding of the content of the three image panes 82, 84, 86, namely, that the central image pane 82 displays what is immediately in the path of the vehicle 10, while the side image panes 84, 86 display what is left and right to the path of the vehicle 10. The image data captured by the wide-angled lens 32 is thus presented in a way that improves driver comprehension of the scene outside the vehicle 10. For example, it may be more readily apparent to the operator that the pedestrian 120 and van 122 are left of the vehicle 10 rather than in the path of the vehicle 10. Similarly, it may be more readily apparent to the operator that the posts 124 are to the right of the vehicle 10 rather than in the path of the vehicle 10. At the same time, it will still be readily apparent to the operator that the posts 126 are directly in the path of the vehicle 10.

The side image panes 84, 86 can be shaped with respect to the horizon to increase the folded effect. The upper edge 84U and the lower edge 84L of the left-side image pane 84 can be angled to be generally parallel to a horizon line 84H of the left-side image pane 84. Similarly, the upper edge 86U and the lower edge 86L of the right-side image pane 86 can be angled to be generally parallel to a horizon line 86H of the right-side image pane 86. The central image pane 82 has horizontal upper and lower edges, which are generally parallel to a horizon line 82H of the central image pane 82 (when the image is displayed for viewing by a driver of the vehicle when normally operating the vehicle). The horizon lines 82H, 84H, 86H represent the horizon resulting from the specific dewarping algorithm used. In the embodiment shown, it can be seen that the horizon line 82H is relatively straight and horizontal (in other words, it has an average angle of about 0 degrees), while the horizon lines 84H and 86H have some small amount of curvature, and are generally angled at some non-zero average angle relative to the average angle of the horizon line 82H. The average angle of the horizon lines 82H, 84H, 86H can be selected during development of the image manipulation routine 26. In other words, the dewarping algorithm can be configured so that it generates image portions in panes 84 and 86 that have horizon lines 84H and 86H that have selected average angles relative to the horizontal. Testing of the dewarping algorithm may be carried out in any suitable environment, such as outside in an open area where the horizon is relatively unobscured by visual obstructions such as buildings.

Selecting the downward slope angles of the edges 84U, 84L, 86U, 86L so that they generally match the average angles of the horizon lines 84H and 86H can increase the folded visual effect (such that it provides an appearance of viewing the environment through a bay window).

The image manipulation routine 26 can apply a static overlay to the displayed dewarped image 80. The overlay is static in that it remains fixed in appearance and fixed positionally when overlaid on the displayed images derived from the image data captured by the camera 12. The static overlay may include generally vertical bands 90 (which may be gaps between the adjacent image panes or demarcation lines or dark lines overlayed at the joint between the adjacent image panes or the like). The bands 90 may simply be referred to as vertical bands 90 however this is simply for readability and it will be understood that these bands 90 need not be strictly vertical but may be generally vertical. One vertical band 90 separates the left-side pane 84 from the central pane 82 and another vertical band 90 separates the right-side pane 86 from the central pane 82. The vertical bands 90 can be a single color, such as white or more preferably black so as to contrast with the image portions shown in the panes 82, 84 and 86 during vehicle use. The vertical bands 90 help visually delineate the side panes 84, 86 from the central pane 82, and may be shaped and sized to appear to the operator of the vehicle 10 like vehicular A- or C-pillars between the rear or front windshield and the side windows. The vertical bands 90 further reinforce the visual division of the horizon line into three relatively straight segments (horizon lines 82H, 84H and 86H) where the left and right segments (horizon lines 84H and 86H) are angled relative to the center segment (horizon line 82H), thereby reinforcing the aforementioned folded visual effect.

The overlay may further include triangular regions 94, 96 above the two side image panes 84, 86. Above the left-side image pane 84 is the left-side triangular region 94 and above the right-side image pane 86 is the right-side triangular region 96. The triangular regions 94, 96 may have the same color as the vertical bands 90 and may be generally contiguous therewith or they may be separated from the vertical bands 90. The color of the triangular regions 94, 96 preferably contrasts with the side image panes 84, 86 to help visually define the shapes of the side image panes 84, 86, and can thus reinforce the folded visual effect of the displayed image 80.

The overlay may further include a trapezoidal region 98 below the three image panes 82, 84, 86. The trapezoidal region 98 occupies space left by the shapes of the side image panes 84, 86 and the arrangement of the side image panes 84, 86 with the central image pane 82 so as to further reinforce the folded visual effect. The trapezoidal region 98 has triangular regions below the side image panes 84, 86 and a rectangular region below the central image pane 82. The trapezoidal region 98 may be the same color as the vertical bands 90 and may be contiguous therewith. The color of the trapezoidal region 98 preferably contrasts with the three image panes 82, 84, 86 to help visually define the shapes of the three image panes 82, 84, 86, so as to reinforce the folded visual effect of the displayed image 80.

In one example, the static regions 94, 96, 98 are shaped and sized to omit or obliterate some image data, but such image data is predetermined to not provide information relevant to the operation of the vehicle 10. Omitted or obliterated image data may represent portions of the captured image expected to contain sky or vehicle body 14. This can be advantageous when the field of view of the camera 12 does not match the aspect ratio of the display 30 or when it is desired to improve the appearance of the image 80. In another example, the triangular and trapezoidal static regions 94, 96, 98 are shaped and sized to not omit or obliterate any captured image data, and the image manipulation routine 26 performs stretching and/or interpolation on image data near the static regions 94, 96, 98 to extend the image to the edges of the static regions 94, 96, 98. This can be advantageous when it is desired to display all of the captured image.

In some embodiments, the vertical bands 90 may block or obliterate some image data, in which case the static vertical bands 90 are preferably relatively thin so as to reduce the types of obstacle or hazard that would be obscured by them. In some embodiments however, the image 80 may be configured to that the vertical bands 90 do not obliterate any image data. Instead, the image manipulation routine 26 may manipulate the image data so that the image is split and the portions shown in the side image panes 84 and 86 are offset from their initial position immediately adjacent the image portion shown in the central image pane 82 to a final position where they are offset from the central image portion by a distance corresponding to the thickness of the respective band 90.

Thus, and in accordance with the present invention, it is preferred to have the central image pane be visually differentiable or demarcatable from each of the side image panes via a demarcation or static overlay. Such a demarcation may be provided in various forms, depending on the particular application and desired display appearance. For example, and such as shown in FIG. 4, the demarcation or static overlay 90 may comprise a small gap that is established between the central image pane and each of the side image panes. Alternatively, such a gap need not be provided, and the likes of a dark or black demarcating line or border or the like may be electronically superimposed at the respective joint between the left image pane and the center image pane and the right image pane and the center image pane (and optionally established so as to block a portion or portions of the displayed image). Optionally, and as discussed above, static overlays or static regions may be provided or established at the perimeter regions of the displayed image (such as above and/or below the center image pane and/or the side image panes or the like). The displayed dewarped image (that is displayed as three image panes at the display) is derived from captured image data (captured by a camera of the vehicle that has an exterior field of view), while the static overlay or overlays or demarcations or static regions provided or overlaid at the displayed image at the display screen are formed from or derived from other than captured image data.

Figure 7:
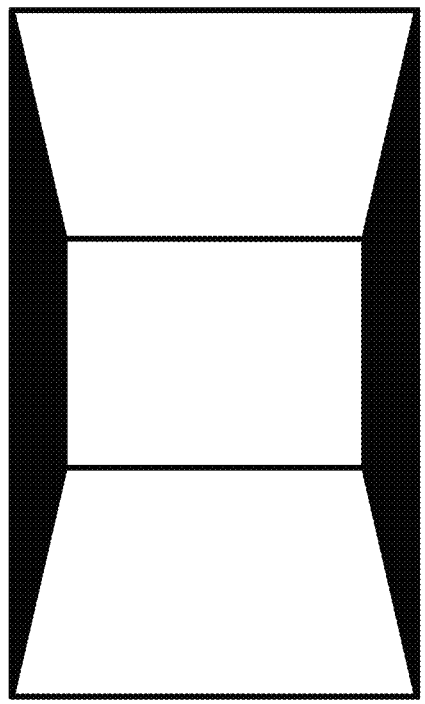
FIGS. 6-10 are diagrams of other three-pane dewarped images in accordance with the present invention.
Figure 6:
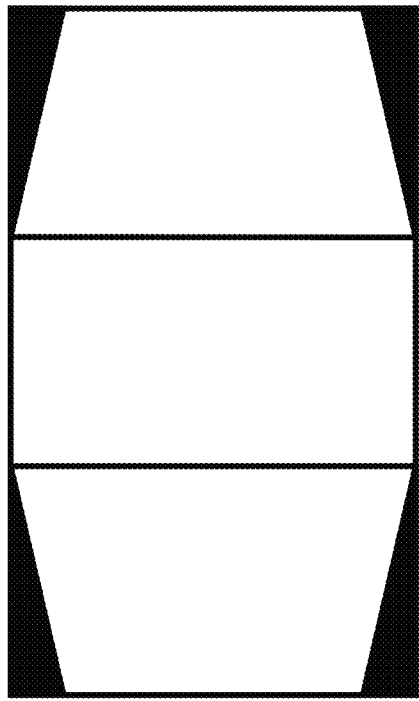
Figure 8:
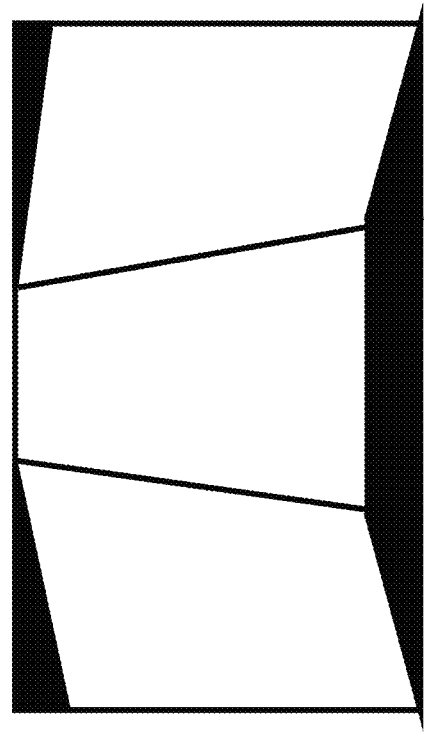
Figure 9:
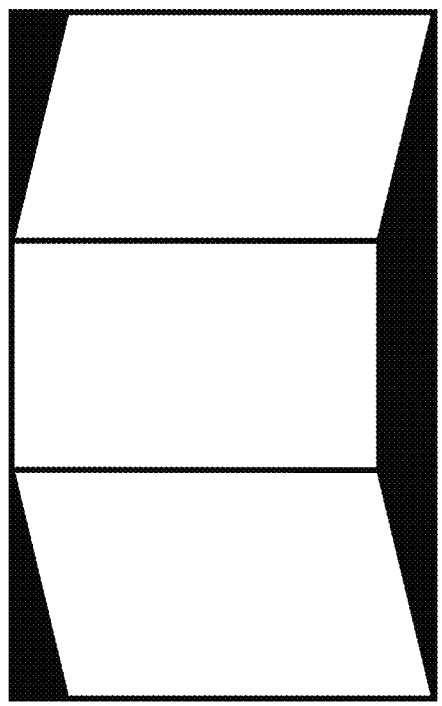
Figure 10:
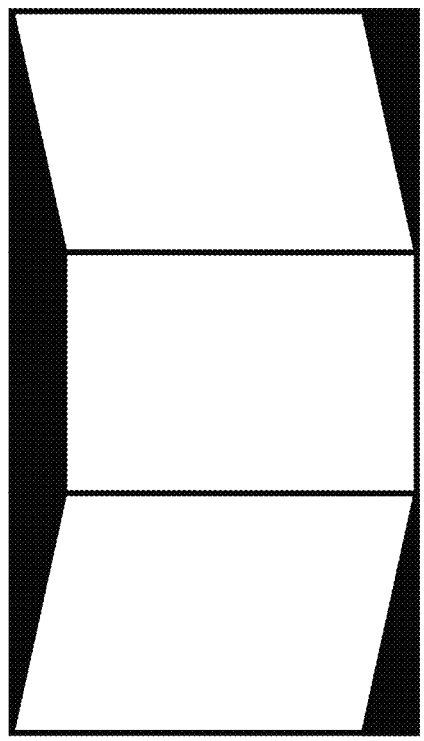

Although shown and described as having three image panes such as shown in FIG. 4, clearly other shaped image panes may be utilized to provide the desired visual effect to the driver viewing the displayed images while operating the vehicle. For example, and with reference to FIGS. 6-10, the three image panes may have non-parallel upper and lower slope angles for the side image panes (such as shown in FIGS. 6 and 7). Optionally, the displayed images may have the center image pane extend vertically from the top of the image to the bottom of the image (with no static region above or below the center pane), such as shown in FIG. 6, or may have static regions both above and below a smaller center image pane, such as shown in FIG. 7. Optionally, and as shown in FIG. 8, the static bands or demarcating bands between the image panes may comprise non-vertical bands. FIGS. 9 and 10 show different approaches, with FIG. 10 being similar to FIG. 4 and FIG. 9 having the static region above the center image pane instead of below the center image pane, with the side image panes having slope angles that are angled upward instead of downward. Other shapes or configurations or appearances of the three paned displayed image may be implemented depending on the particular application of the vision system and desired display for viewing by the driver.

Because customers may find the split or tri view scenes difficult to comprehend, various pane shapes and/or border overlays help provide a visual reference. Optionally, the display may further include ground position reference overlays that may serve as additional cues to enhance the driver's ability to judge distances to objects present in the field of view of the camera and to judge the speeds of objects that are moving in the field of view of the camera. Various exemplary overlays are shown in FIGS. 11-15, with FIGS. 11-15 including similar reference numbers as used in FIG. 4.

Figure 11:
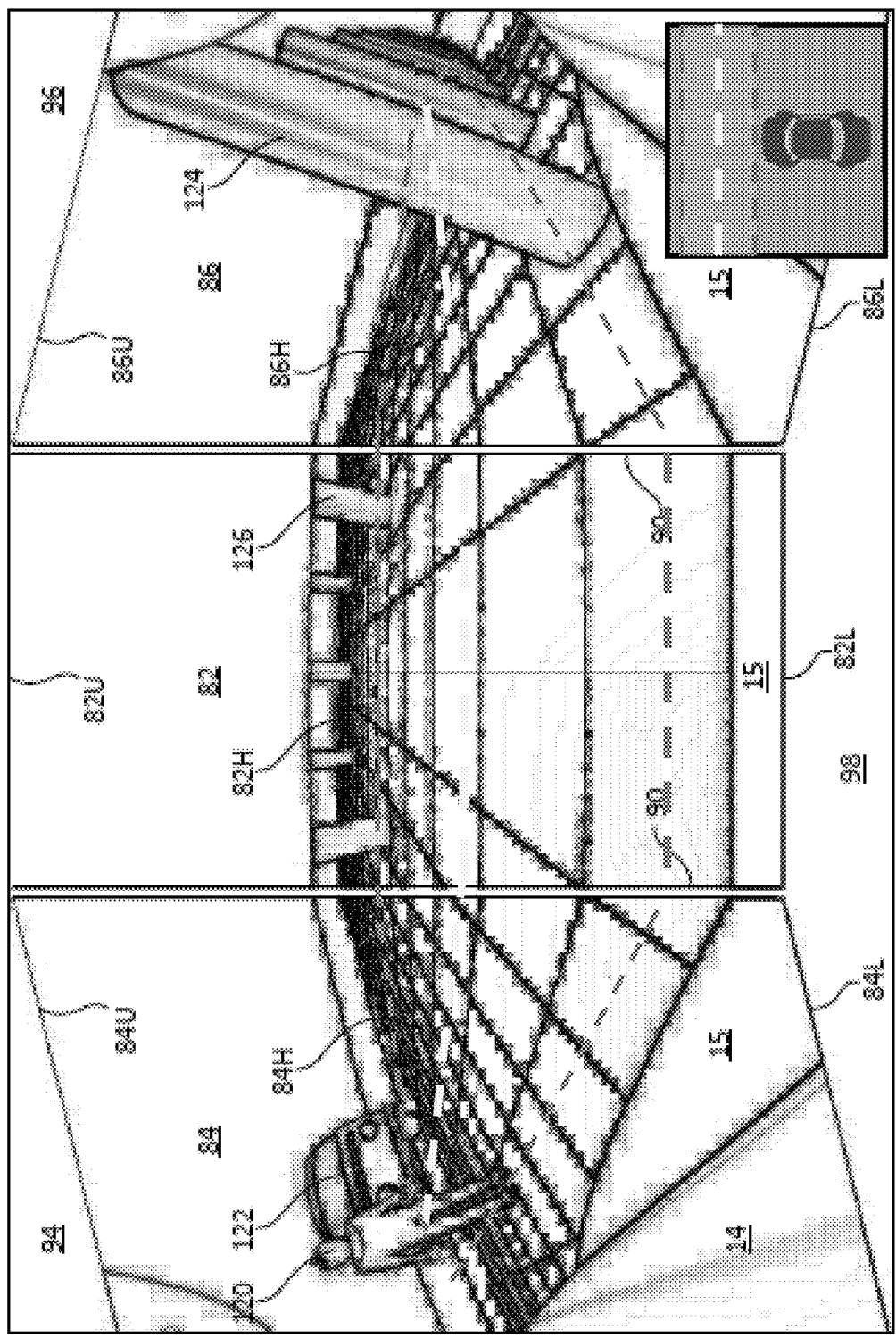
FIG. 11 is a diagram of another dewarped image having three panes as generated by the vehicle vision system, shown with a road outline overlay and with a vehicle reference icon to enhance the driver's ability to judge distances and speeds of objects in the image.
Figure 12:
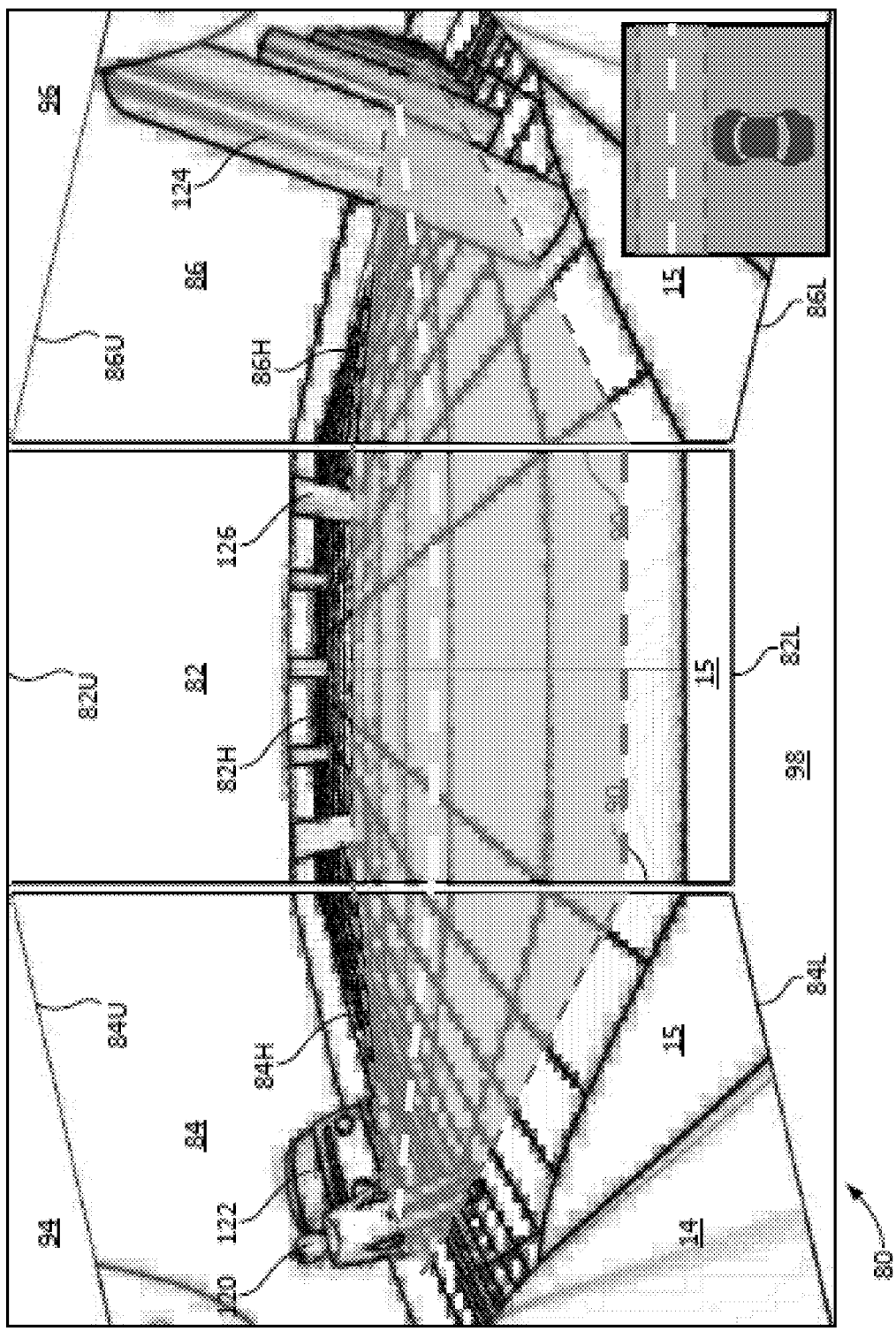
Figure 13:
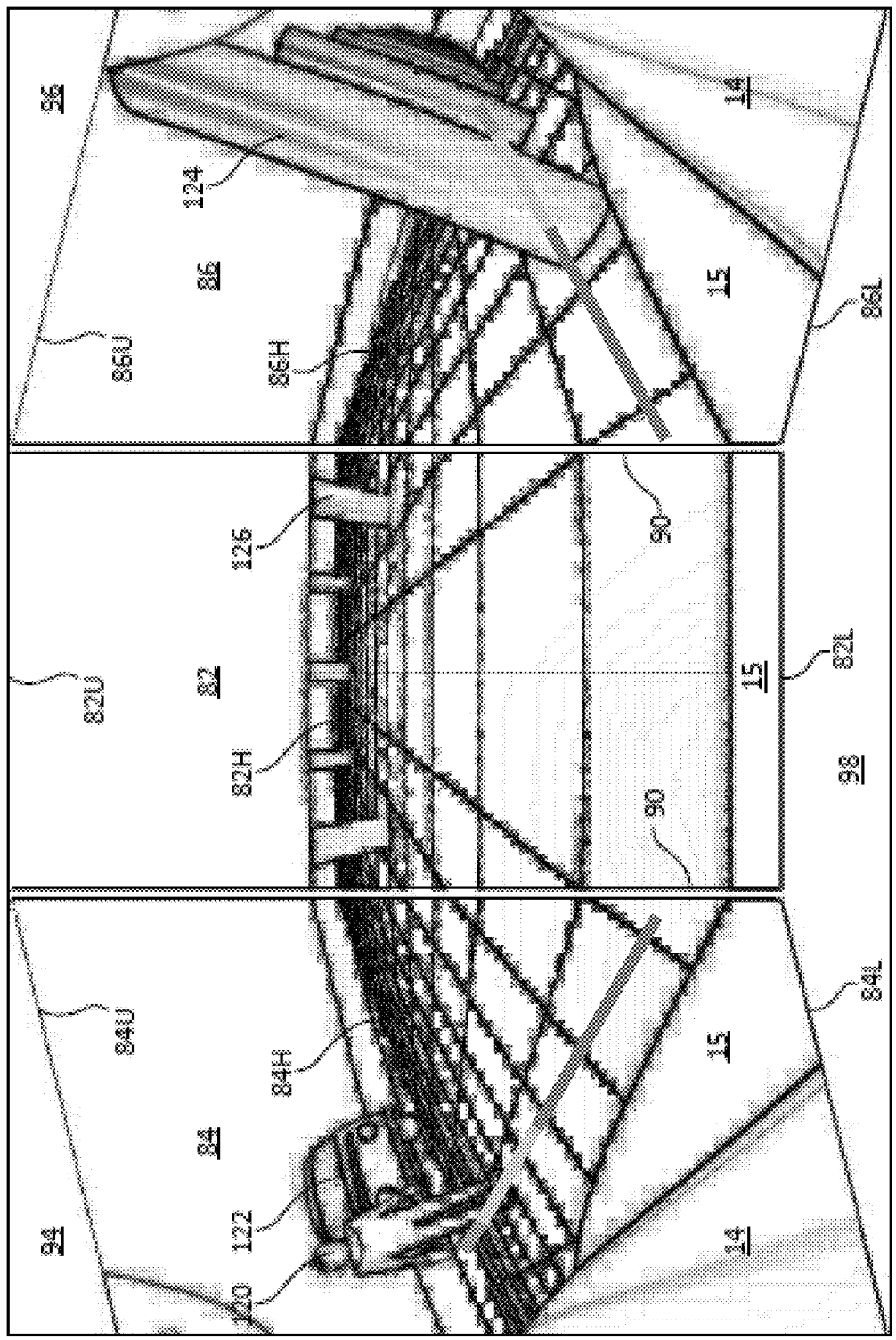
FIG. 13 is a diagram of a dewarped image similar to FIG. 11, shown with color gradient line overlays to enhance the driver's ability to judge distances and speeds of objects in the image.
Figure 14:
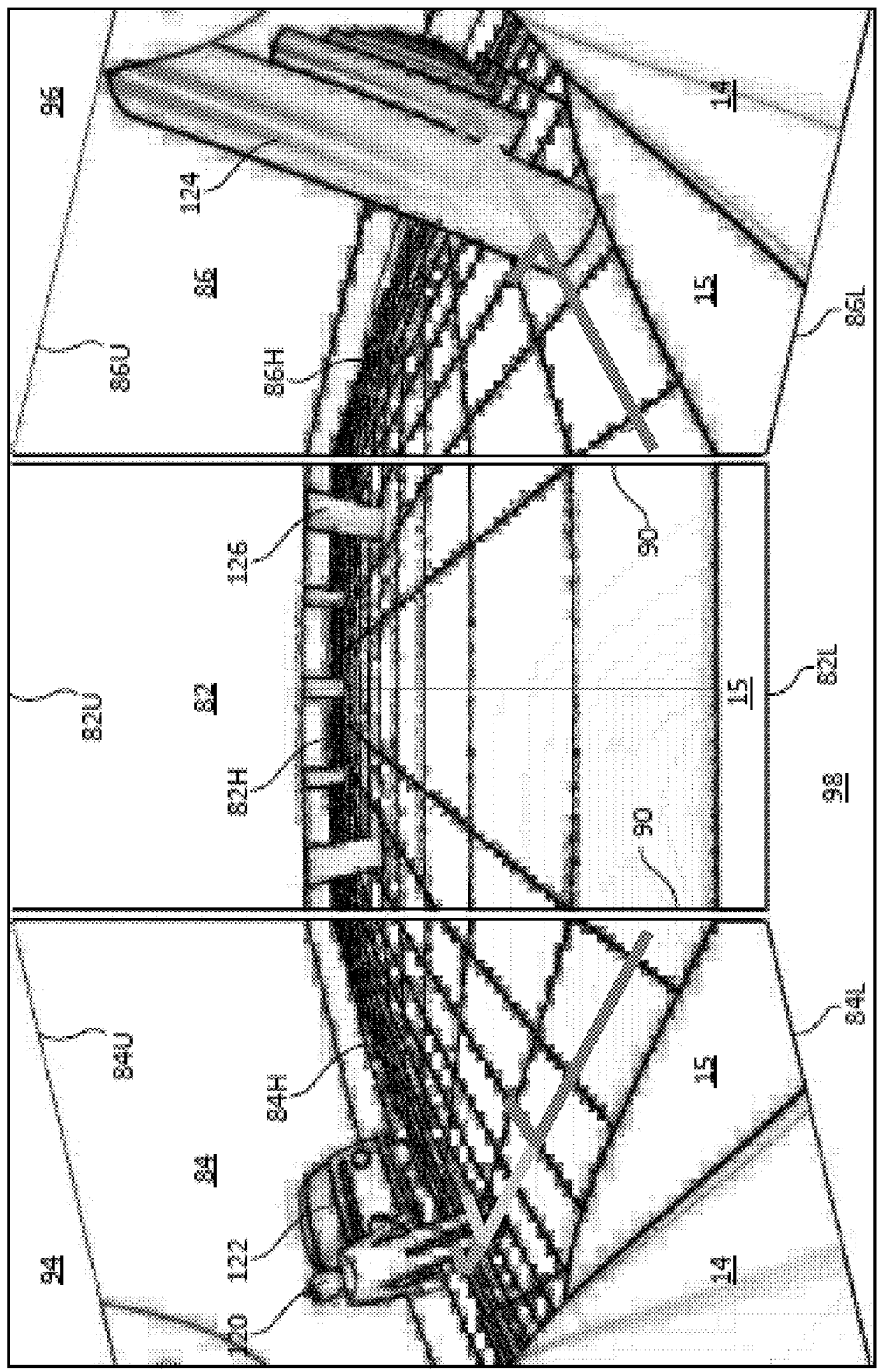
FIG. 14 is a diagram of a dewarped image similar to FIG. 13, shown with the color gradient line overlays having markers therealong.
Figure 15:
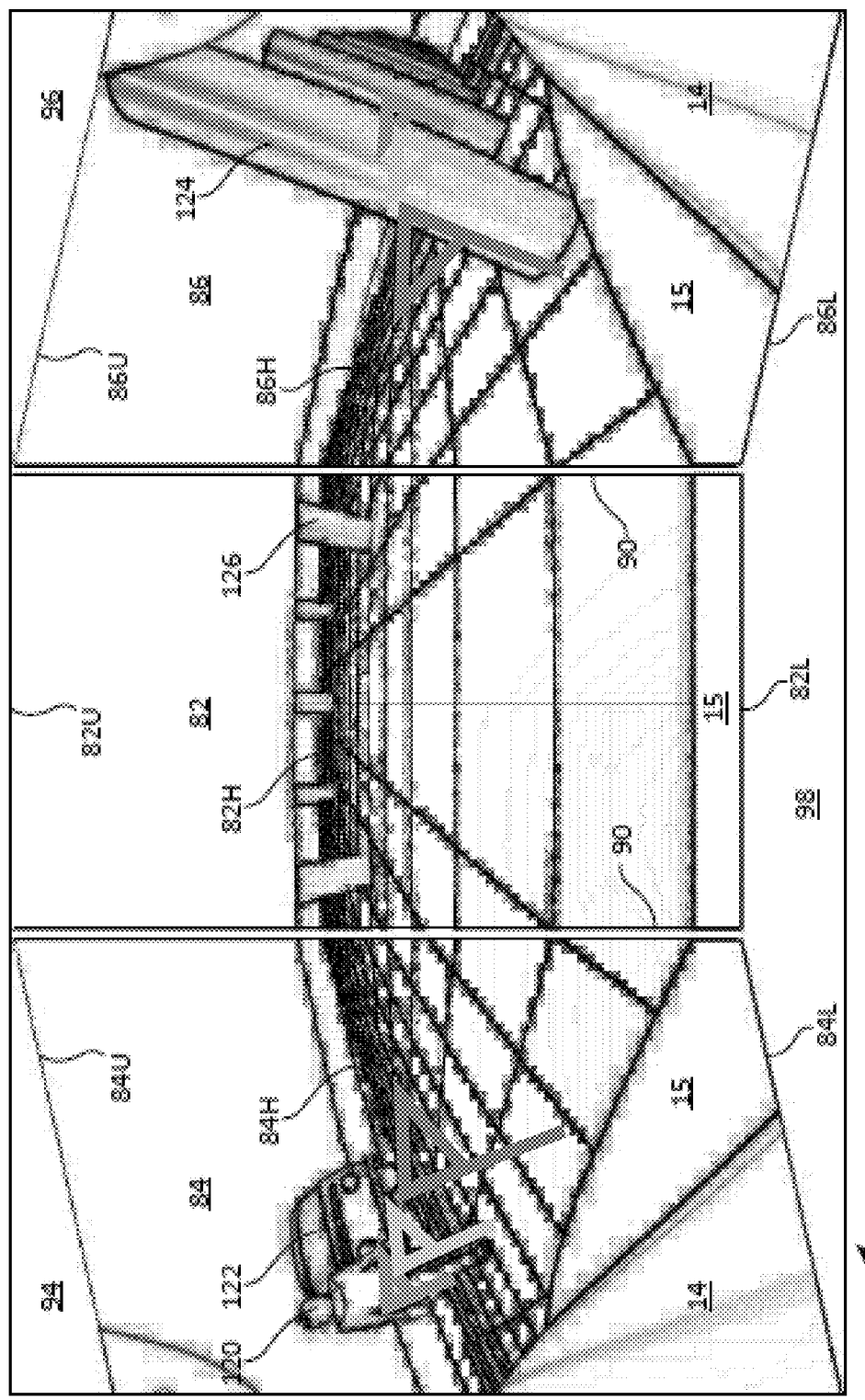
FIG. 15 is a diagram of a dewarped image similar to FIG. 13, shown with distance flags overlays to enhance the driver's ability to judge distances and speeds of objects in the image.

For example, and with reference to FIG. 11, a dewarped image having three image panes as generated by the vehicle vision system of the present invention is shown with a road outline overlay and with a vehicle reference icon (shown in the lower left corner region of the displayed image, but it could be elsewhere in the displayed image) to enhance the driver's ability to judge distances and speeds of objects in the image. Optionally, and such as shown in FIG. 12, the road outline overlay may be colored or filled in. The road outline overlay part may be defined as semi-transparent such that the objects in the area are not obscured by the overlay while the impression of the road is still conveyed to driver. Optionally, and with reference to FIG. 13, color gradient line overlays may be incorporated in the displayed images to enhance the driver's ability to judge distances and speeds of objects in the image. Optionally, and as shown in FIG. 14, the color gradient line overlays having markers therealong (such as short horizontal lines spaced along the line overlays). Optionally, distance flag or marker or indicator overlays may be generated (such as shown in FIG. 15) to enhance the driver's ability to judge distances and speeds of objects in the image. Other overlays may be incorporated to provide the desired information or enhancement, while remaining within the spirit and scope of the present invention. The overlays may utilize aspects of the systems described in U.S. Pat. Nos. 5,670,935; 5,949,331; 6,222,447 and 6,611,202, and/or U.S. patent application Ser. No. 12/677,539, filed Mar. 31, 2010, now U.S. Pat. No. 8,451,107, which are hereby incorporated herein by reference in their entireties.

The camera 12 can be positioned and the image manipulation routine 26 correspondingly configured so that the dewarped image 80 contains at least a portion of the bumper 15 of the vehicle 10. In some embodiments, the bumper appears in all three image panes 82, 84 and 86. This can advantageously assure the vehicle operator that all hazards adjacent the vehicle 10 are visible on the display 30. In other words, it assures the driver that there is no portion of the environment behind the vehicle (or in front of the vehicle in forward-facing embodiments) that is omitted from the images. Additionally, it gives the driver of the vehicle a point of reference for where the vehicle 10 is relative to the images. This facilitates precise positioning of the vehicle 10 relative to objects shown in the images. For example, it facilitates parking the vehicle very close to another vehicle that is within the field of view of the camera 12 without fear of colliding with the other vehicle.

The image manipulation routine 26 can be embodied by one or more of a remapping table, function, algorithm, or process that acts on a set of pixels to generate a respective set of processed pixels.

Figure 5:
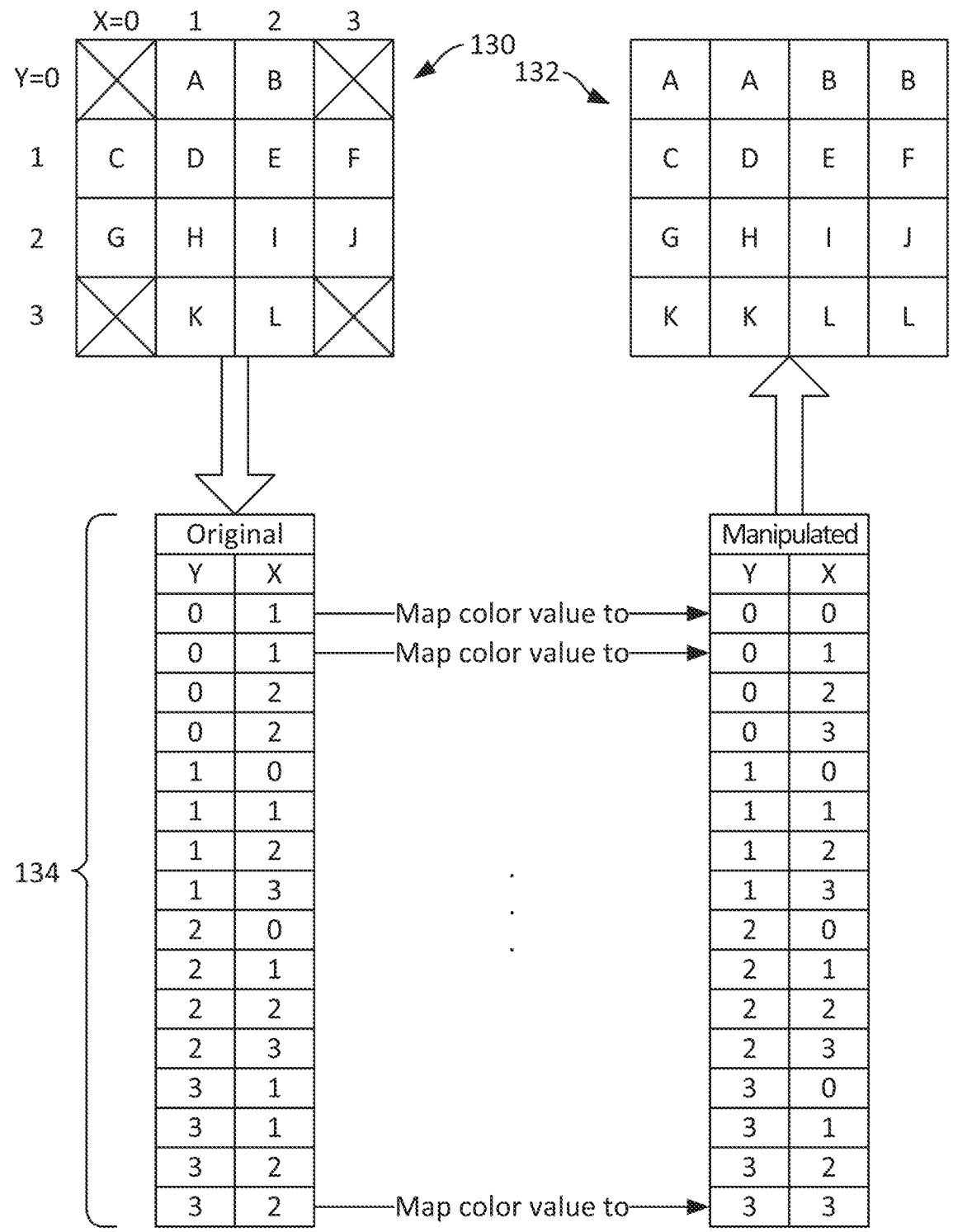
FIG. 5 is a diagram of a remapping table.

As shown in FIG. 5, a remapping table 134 correlates X and Y coordinates of source pixels of a source image 130 captured by the camera 12 to X and Y coordinates of destination pixels of a destination image 132 for output at the display 30. The remapping table 134 allows color values A-L of each source pixel to be set at the X and Y coordinates of a corresponding destination pixel. In this example, corner pixels of the source image 130 lack image data, so the remapping table 134 references color values of neighboring pixels to populate corner pixels of the destination image 132. Although simplified to 16 pixels for explanatory purposes, the remapping table 134 can correspond to a dewarping operation that increases the size of the destination image 132 as well as make the destination image 132 rectangular when compared to the source image 130, which is nominally round. This technique can be used by increasing the number of pixels to achieve any of the image manipulations discussed herein.

Each X-Y pair of coordinates' values in remapping table 134 may also represent a multiple pixel group. For example, a group of 4×4 pixels (16 pixels in total) may be represented by four pairs of X-Y coordinates at the four corners. Only the four corner pixel coordinates of the source image are stored in remapping table 134. The other pixels inside the 4×4 square can be interpolated by the four corner pixel coordinates. The method of interpolation may comprise, but may not be limited to, a two dimensional (2D) bilinear interpolation technique or the like. Using multi-pixel group mapping can save memory space thus save system cost. The number of pixels in the mapping group and the shape of the mapping group may vary. For example, a 16×16 or a 16×12 group may be considered depending on the application requirement.

The remapping table 134 can have constant values for destination pixels of the static bands and regions 90, 94, 96, 98, and such constant values are used regardless of whether or not source pixel data is available. The constant values can be assigned to represent certain static color values that define the color of the bands and regions.

The image manipulation routine 26 can include instructions for carrying out the remapping of pixels, and can further include any remapping tables as well. Alternatively, any remapping tables can be stored in the memory 24 separately from the image manipulation routine 26.

In another example, a remapping function takes as input source pixel coordinates and color values and outputs destination pixel coordinates and color values. In this case, the image manipulation routine 26 includes instructions that define the remapping function. The image manipulation routine 26 can use interpolation or extrapolation to output color values for pixels that do not directly correlate to pixels in the captured image. Although interpolation or extrapolation may result in blur or an apparent loss of image fidelity, it can also result in a larger or more easily comprehensible image. When the side image panes 84, 86 are reflectionally symmetric, the remapping function can be passed a parameter that identifies the specific image pane 84, 86, so that the remapping function can operate on the pane's pixels accordingly.

The remapping function can call an overlay function to generate the static bands and regions 90, 94, 96, 98. The static band may comprise a static picture, which is overlayed on to the dewarped live image. Alpha blending of the overlay picture is defined such that the live image area(s) are transparent in the overlay picture so that can be seen by the user, while the static areas, such as at 90, 94, 96, 98, are defined as opaque. Certain areas of the overlay graph are defined as semi-transparent by the alpha value of the overlay picture, so that the areas are not totally obscured by the overlay graph.

In other examples, other techniques can alternatively or additionally be used for the image manipulation routine 26.

In any of the examples described herein, the processor 22 can be configured to generate the dewarped image 80 based on image data received from a single camera (such as camera 12). That is, the processor 22 need not use image data provided by multiple cameras, if any other cameras are provided to the vehicle 10, to carry out the image processing described herein.

The techniques described above can emphasize to the vehicle operator that the side image panes 84, 86 are more lateral to the vehicle 10 than may be apparent from the originally captured image. For example, the approaching vehicle 78 in the original image 60 in FIG. 3 may have a position or may be moving in a way that is misperceived by the driver due to the distortion caused by the wide-angle lens 32. While the vehicle 78 is indeed a hazard to the driver wishing to enter the lane 62, the distortion of the image 60 may be confusing to the driver and may cause the driver to not fully understand the approaching hazard. However, the processed image 80 in FIG. 4 is dewarped and includes three panes that are shaped and arranged as well as separated and contrasted by static bands and regions 90, 94, 96, 98 to emphasize the lateral nature of the image data in the side image panes 84, 86. This folded visual effect can provide for quick and accurate assessment of the content of the image 80. Accordingly, it can be more readily apparent to the driver that the hazards 120, 122, 124 are lateral of the vehicle 10.

While side image panes 84, 86 have the advantage of alerting drivers to oncoming cross-traffic or other hazards that may be obstructed by blind spots or obstacles, showing the central image pane 82 as well provides a further advantage even if the scene of the central image pane 82 is clearly directly visible via the rear-view mirror or front windshield. This advantage is that the driver does not have to switch his/her attention between the display 30 and the rear view mirror or front windshield, and can thus observe the entire scene on the display 30.

Figure 16:
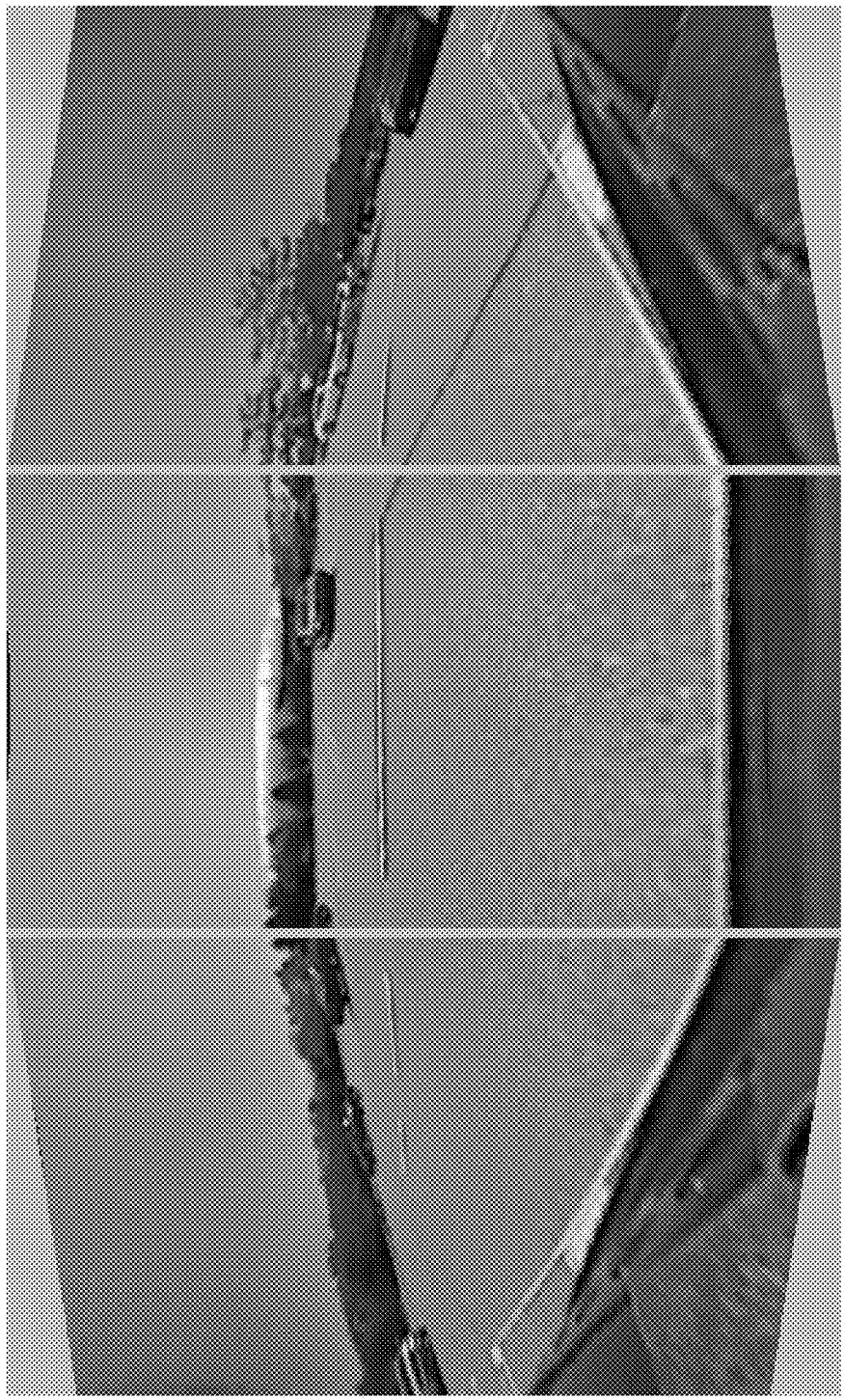
FIG. 16 is an image of another dewarped image having three panes as generated by the vehicle vision system in accordance with the present invention.
Figure 17:
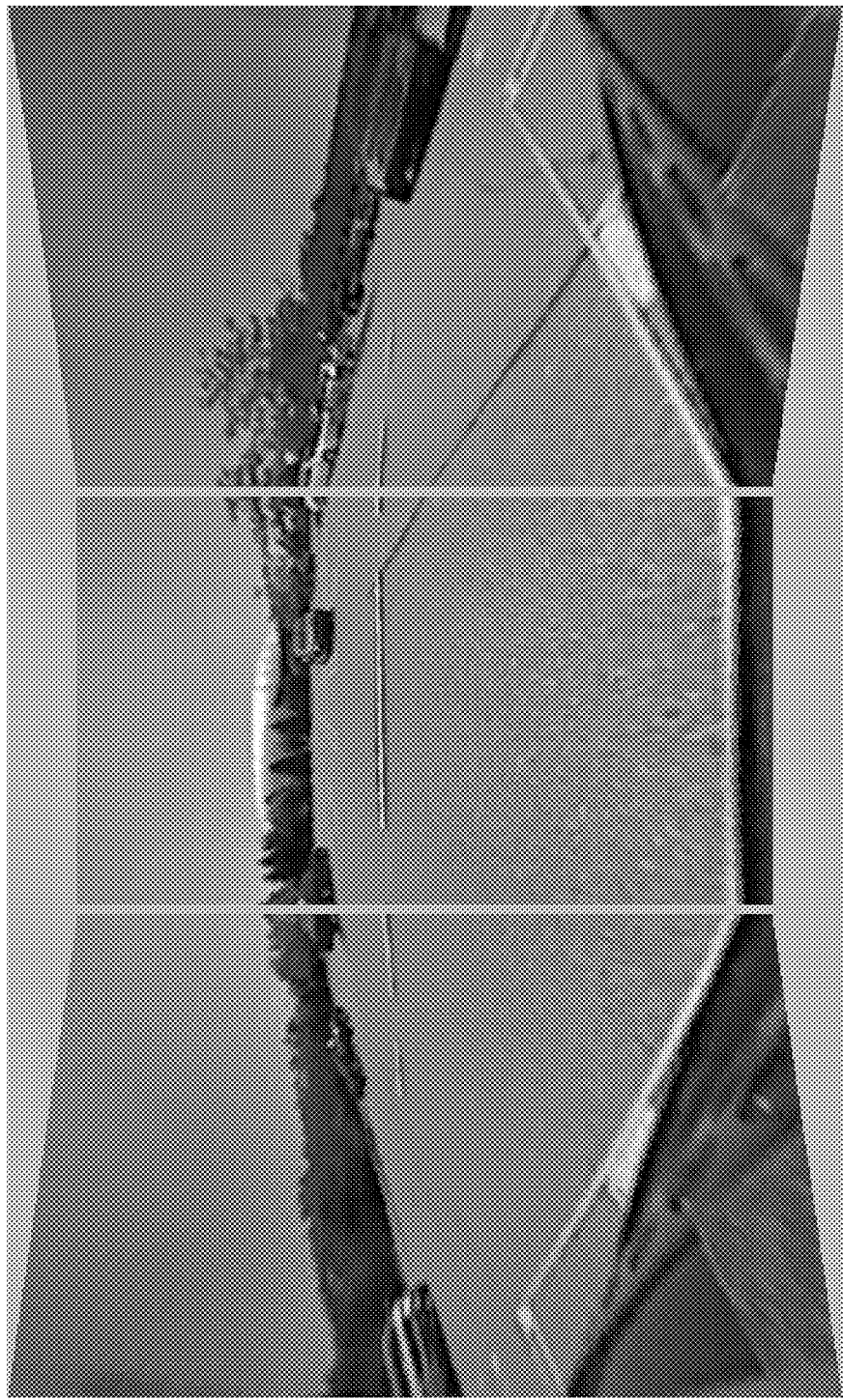
FIG. 17 is another image of the dewarped image similar to that of FIG. 16, but with the center pane reduced and the side images enlarged.
Figure 18:
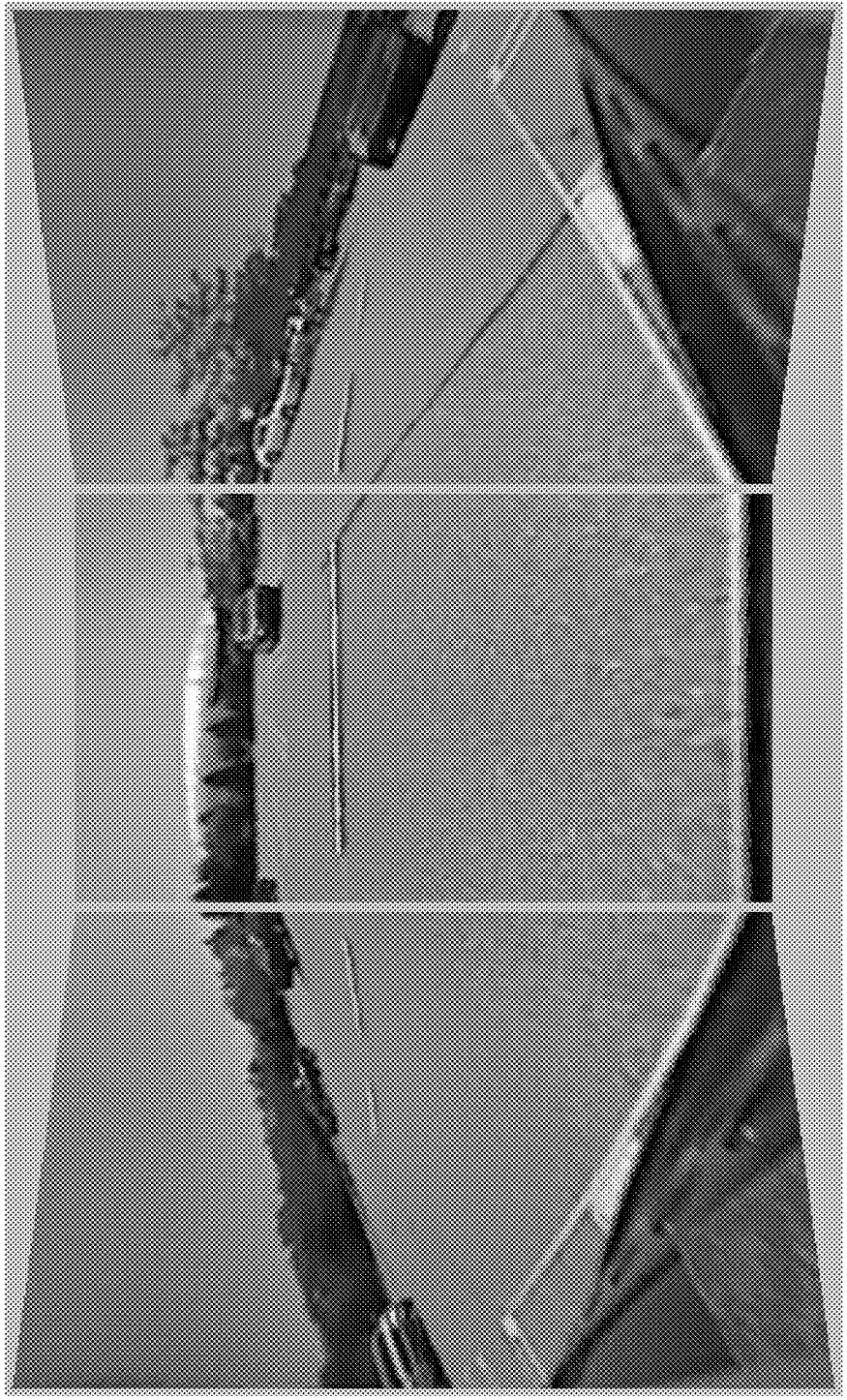
FIG. 18 is another image similar to that of FIG. 17, but with an additional zoom to increase the size of objects shown at the center pane.
Figure 19:
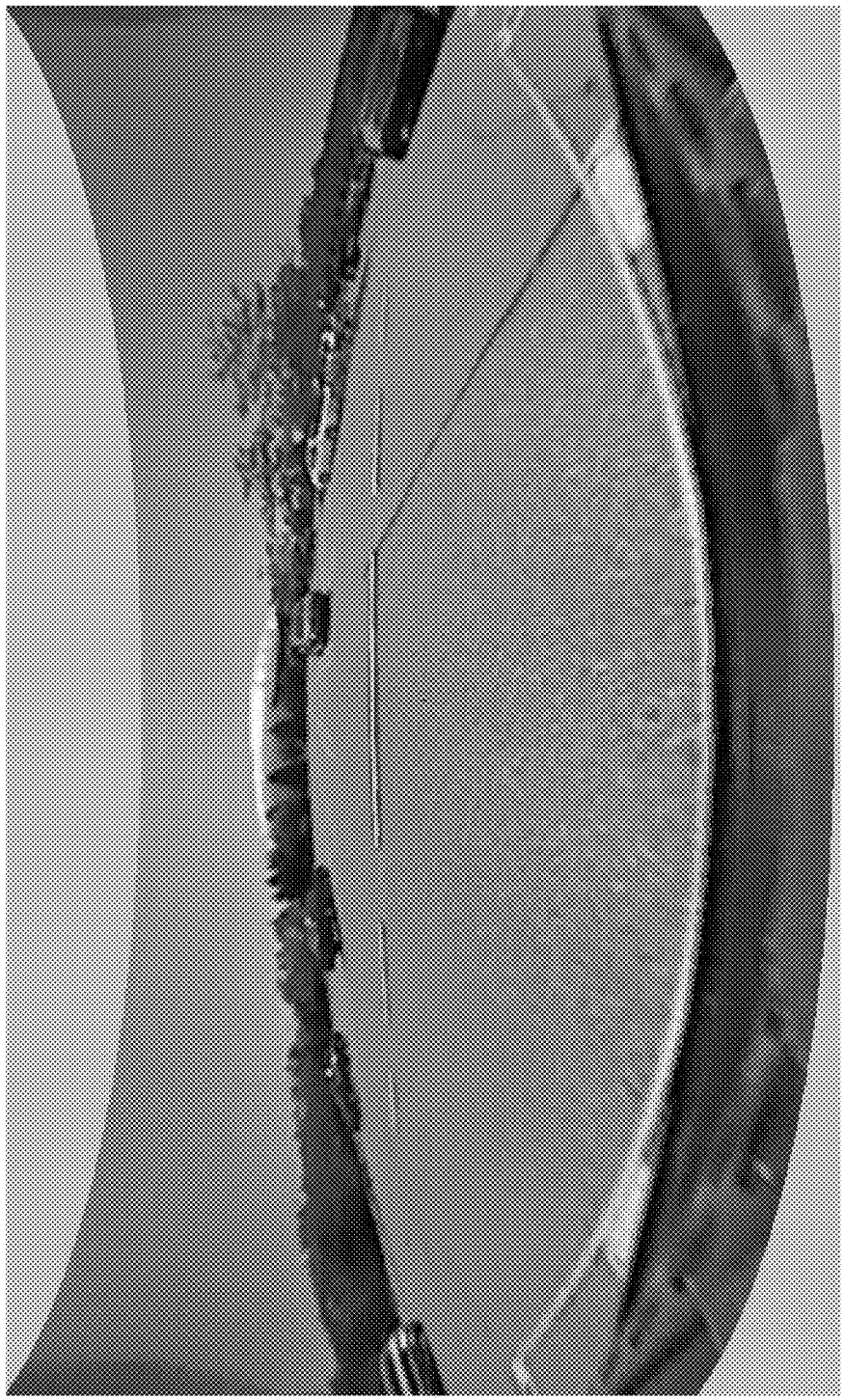
FIGS. 19-22 are images of another dewarped image having a curved displayed image as generated by the vehicle vision system in accordance with the present invention, with FIGS. 20-22 configured to display the objects at the side regions as a larger size.

Thus, the present invention provides dewarped images in a multi-pane configuration to provide a desired display of objects rearward of the vehicle and sideward and rearward of the equipped vehicle in a manner that is readily seen and discerned and understood by the driver of the vehicle, when viewing the displayed images during a reversing maneuver of the vehicle. Optionally, and as can be seen with reference to FIGS. 16-18, the size of the image panes and the degree of zoom of the dewarped images shown in each image pane may be adjusted to provide the desired effect. For example, the image shown in FIG. 17 has enlarged side image panes and a reduced center image pane as compared to the image shown in FIG. 16, while the image shown in FIG. 18 has an increased zoom or enlargement factor at the center image pane as compared to the image shown in FIG. 17. The degree of zoom and the relative sizes of the center and side image panes may be adjusted or selected depending on the particular application of the vision system and the desired display features.

Figure 20:
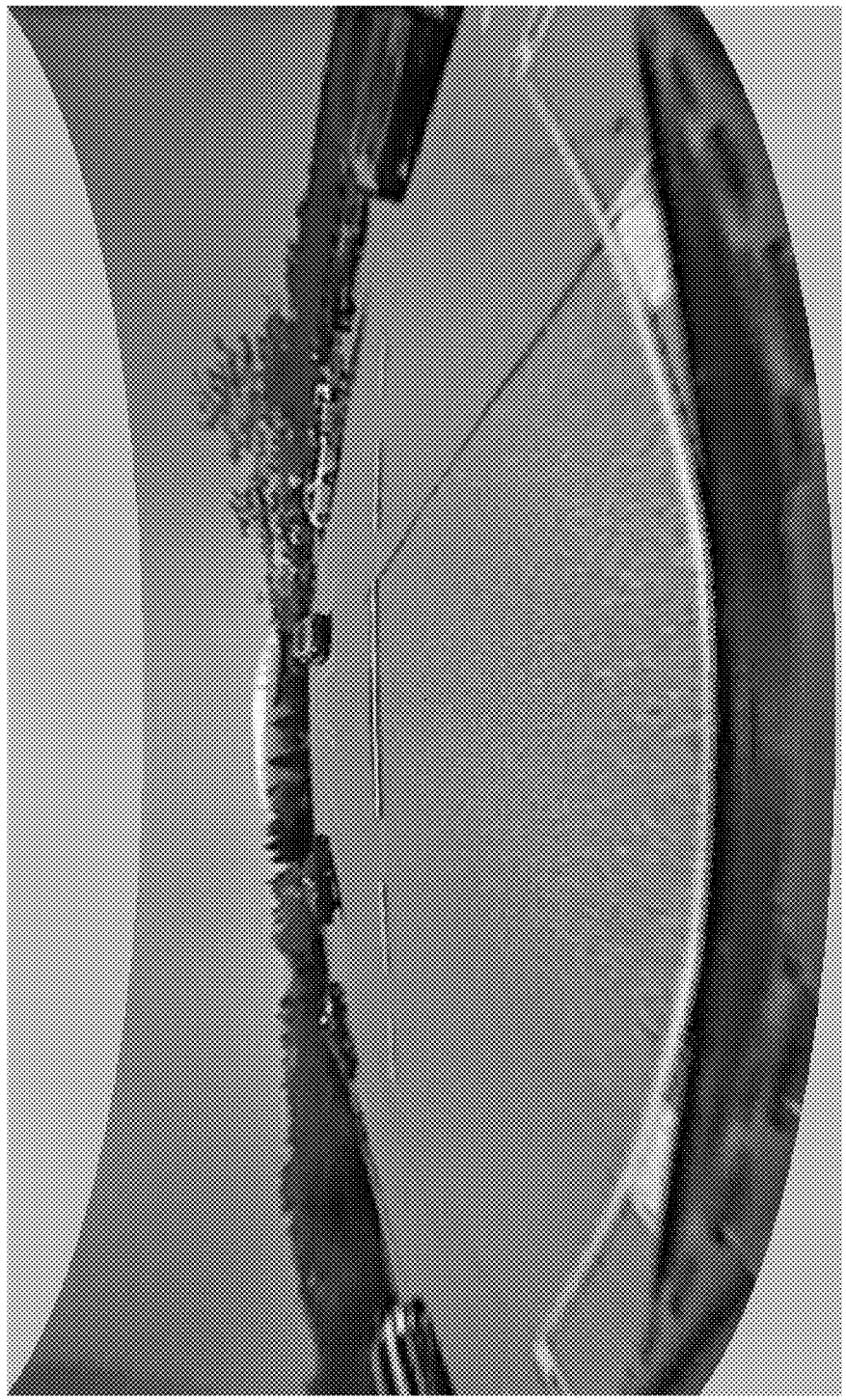
Figure 21:
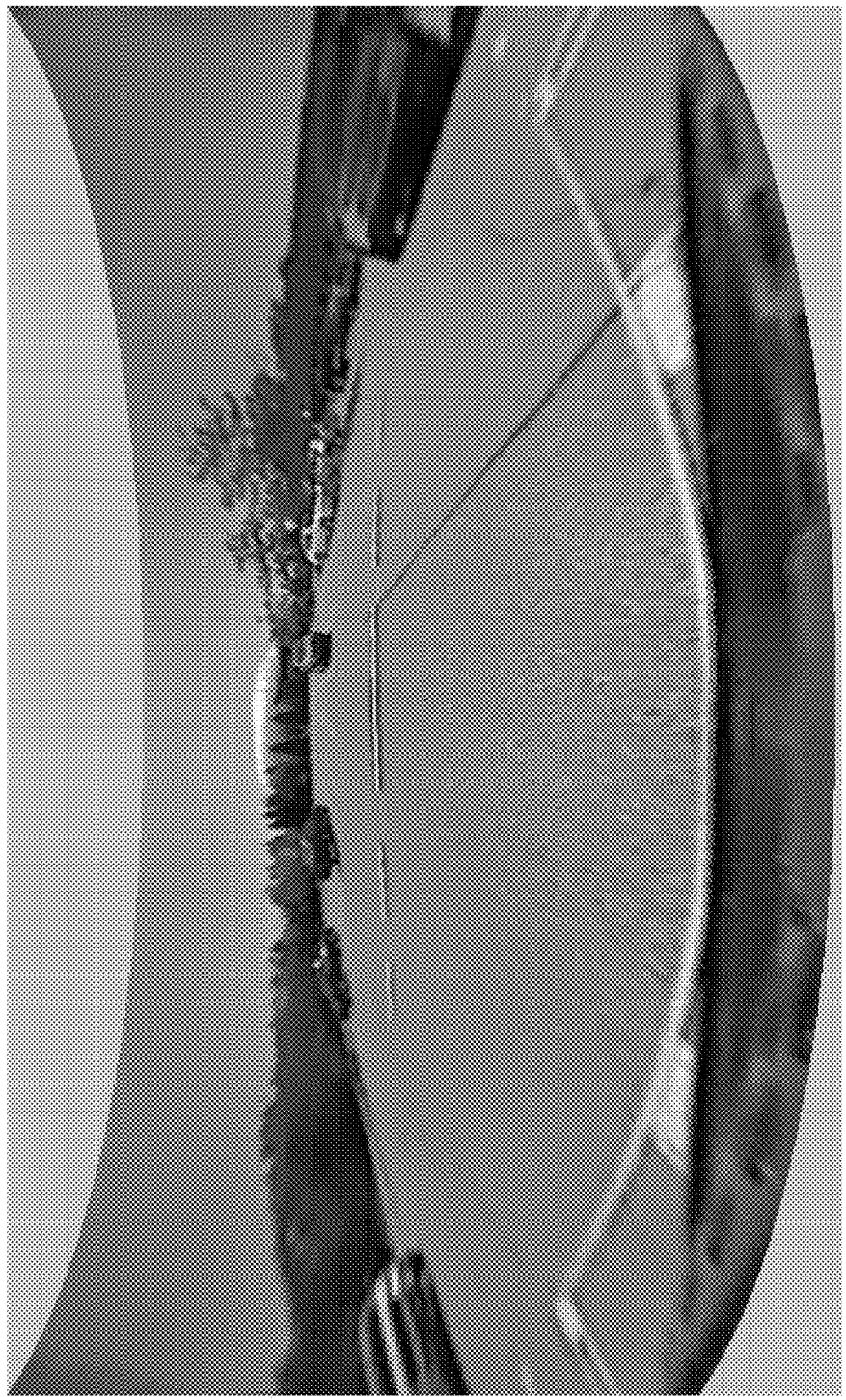
Figure 22:
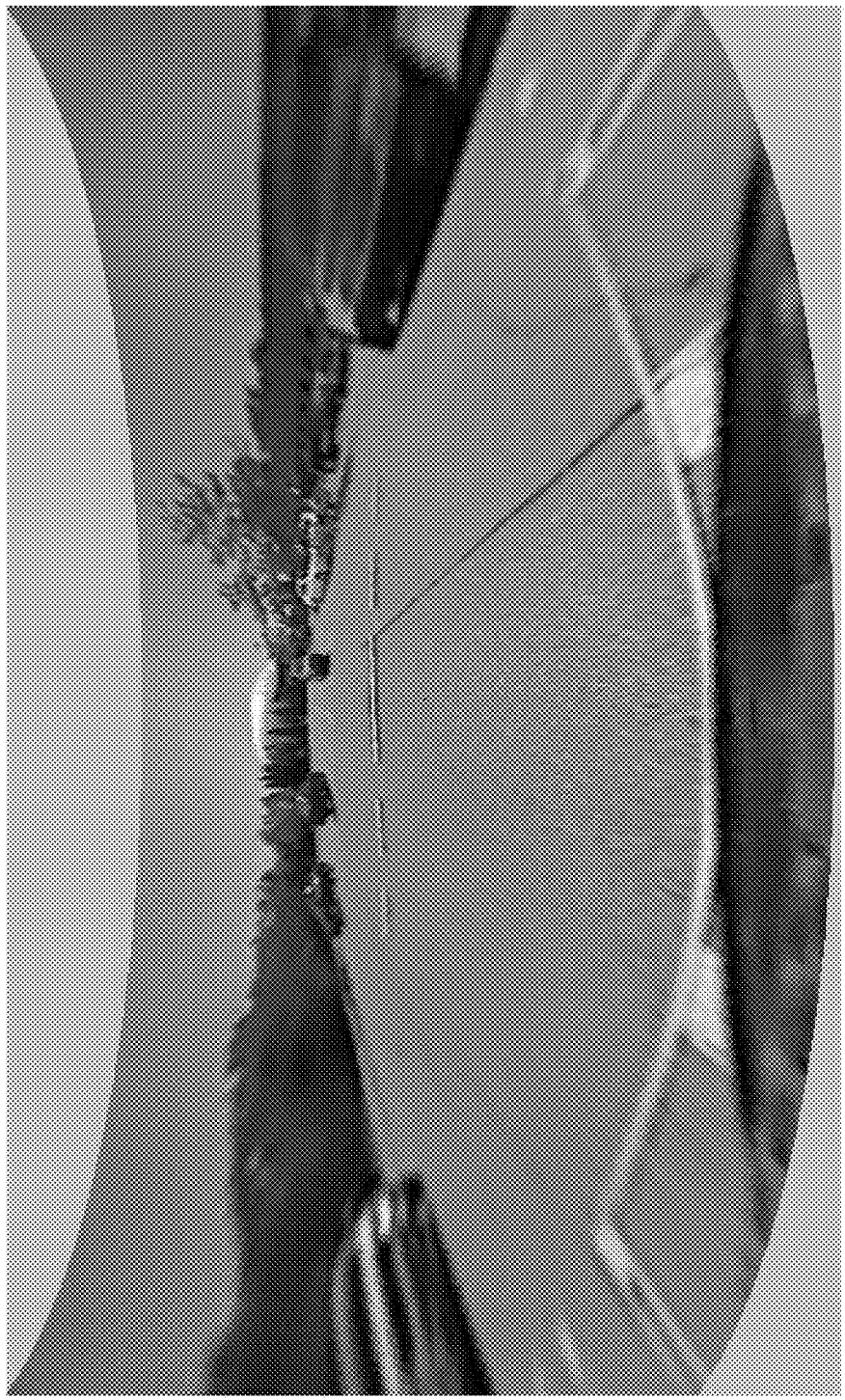

Optionally, and with reference to FIGS. 19-22, the processor of the present invention may provide a curved wide angle dewarped image for display without the multi-panes of the displays discussed above. Visual cues such as the crescent shaped overlay regions at the top and bottom of the image can be used to improve understanding of the manipulated scene. For example, such cues help users perceive the image as having a three dimensional effect, such as with the three pane view. The images may be compressed at the center region and/or expanded at the side regions to provide, when displayed at a video display for viewing by the driver of the vehicle, enhanced viewing of objects sideward and rearward of the vehicle, which may be particularly useful when backing out of a parking space or the like (so as to enhance viewing of vehicles approaching the parking space from the left or right of the parked vehicle). For example, and as can be seen with reference to FIGS. 19-22, the side regions of the image of FIG. 20 are larger than the side regions of the image of FIG. 19, while the side regions of the image of FIG. 21 are larger than the side regions of the image of FIG. 20, and the side regions of the image of FIG. 22 are larger than the side regions of the image of FIG. 21. The degree of zoom and the relative sizes of the center and side regions of the curved images may be adjusted or selected depending on the particular application of the vision system and the desired display features.

Thus, in accordance with the present invention, a substantially dewarped image is produced, where the displayed image does not exhibit a fish eye or otherwise warped image to the driver viewing the in-cabin display. The displayed image thus may substantially represent what the driver would see if directly viewing at least a portion of the same scene.

Although the terms "image data" and "data" may be used in this disclosure interchangeably with entities represented by image data, such as images, portions of images, image regions, panes, and the like, one of ordinary skill in the art, given this disclosure, will understand how image data and entities represented by image data interrelate.

Optionally, the video display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display a compass heading or directional heading character or icon (or other icon or indicia or displayed images) when the vehicle is not undertaking a reversing maneuver, such as when the vehicle is being driven in a forward direction along a road (such as by utilizing aspects of the display system described in PCT Application No. PCT/US2011/056295, filed Oct. 14, 2011 and published Apr. 19, 2012 as International Publication No. WO 2012/051500, which is hereby incorporated herein by reference in its entirety).

The system includes an image processor operable to process image data captured by the camera or cameras, such as for detecting objects or other vehicles or pedestrians or the like in the field of view of one or more of the cameras. For example, the image processor may comprise an EYEQ2 or EYEQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle. Optionally, the image processor may utilize aspects of the systems described in U.S. Pat. No. 7,697,027, which is hereby incorporated herein by reference in its entirety.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, an array of a plurality of photosensor elements arranged in at least 640 columns and 480 rows (at least a 640×480 imaging array), with a respective lens focusing images onto respective portions of the array. The photosensor array may comprise a plurality of photosensor elements arranged in a photosensor array having rows and columns. The logic and control circuit of the imaging sensor may function in any known manner, and the image processing and algorithmic processing may comprise any suitable means for processing the images and/or image data. For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or PCT Application No. PCT/US2010/047256, filed Aug. 31, 2010 and published Mar. 10, 2011 as International Publication No. WO 2011/028686 and/or International Publication No. WO 2010/099416, published Sep. 2, 2010, and/or PCT Application No. PCT/US10/25545, filed Feb. 26, 2010 and published Sep. 2, 2010 as International Publication No. WO 2010/099416, and/or PCT Application No. PCT/US2012/048800, filed Jul. 30, 2012, and published on Feb. 7, 2013 as International Publication No. WO 2013/019707, and/or PCT Application No. PCT/US2012/048110, filed Jul. 25, 2012, and published on Jan. 31, 2013 as International Publication No. WO 2013/016409, and/or PCT Application No. PCT/CA2012/000378, filed Apr. 25, 2012, and published on Nov. 1, 2012 as International Publication No. WO 2012/145822, and/or PCT Application No. PCT/US2012/056014, filed Sep. 19, 2012, and published on Mar. 28, 2013 as International Publication No. WO 2013/043661, and/or PCT Application No. PCT/US12/57007, filed Sep. 25, 2012, and published on Apr. 4, 2013 as International Publication No. WO 2013/048994, and/or PCT Application No. PCT/US2012/061548, filed Oct. 24, 2012, and published on May 2, 2013 as International Publication No. WO 2013/063014, and/or PCT Application No. PCT/US2012/062906, filed Nov. 1, 2012, and published on May 1, 2013 and International Publication No. WO 2013/067083, and/or PCT Application No. PCT/US2012/063520, filed Nov. 5, 2012, and published on May 16, 2013 as International Publication No. WO 2013/070539, and/or PCT Application No. PCT/US2012/064980, filed Nov. 14, 2012, and published on May 23, 2013 as International Publication No. WO 2013/074604, and/or PCT Application No. PCT/US2012/066570, filed Nov. 27, 2012, and published on Jun. 6, 2013 as International Publication No. WO 2013/081984, and/or PCT Application No. PCT/US2012/066571, filed Nov. 27, 2012, and published on Jun. 6, 2013 as International Publication No. WO 2013/081985, and/or PCT Application No. PCT/US2012/068331, filed Dec. 7, 2012, and published on Jun. 13, 2013 as International Publication No. WO 2013/086249, and/or PCT Application No. PCT/US2013/022119, filed Jan. 18, 2013, and published on Jul. 25, 2013 as International Publication No. WO 2013/109869, and/or PCT Application No. PCT/US2013/027342, filed Feb. 22, 2013, and published on Aug. 9, 2013 as International Publication No. WO 2013/126715, and/or U.S. patent application Ser. No. 13/847,815, filed Mar. 20, 2013, and published on Oct. 31, 2013 as U.S. Publication No. US-2013-0286193; Ser. No. 13/779,881, filed Feb. 28, 2013, now U.S. Pat. No. 8,694,224; Ser. No. 13/785,099, filed Mar. 5, 2013, now U.S. Pat. No. 9,565,342; Ser. No. 13/774,317, filed Feb. 22, 2013, now U.S. Pat. No. 9,269,263; Ser. No. 13/774,315, filed Feb. 22, 2013, and published on Aug. 22, 2013 as U.S. Publication No. US-2013-0215271; Ser. No. 13/681,963, filed Nov. 20, 2012, now U.S. Pat. No. 9,264,673; Ser. No. 13/660,306, filed Oct. 25, 2012, now U.S. Pat. No. 9,146,898; Ser. No. 13/653,577, filed Oct. 17, 2012, now U.S. Pat. No. 9,174,574; and/or Ser. No. 13/534,657, filed Jun. 27, 2012, and published on Jan. 3, 2013 as U.S. Publication No. US-2013-0002873, and/or U.S. provisional applications, Ser. No. 61/766,883, filed Feb. 20, 2013; Ser. No. 61/760,368, filed Feb. 4, 2013; Ser. No. 61/760,364, filed Feb. 4, 2013; Ser. No. 61/758,537, filed Jan. 30, 2013; Ser. No. 61/754,8004, filed Jan. 21, 2013; Ser. No. 61/745,925, filed Dec. 26, 2012; Ser. No. 61/745,864, filed Dec. 26, 2012; Ser. No. 61/736,104, filed Dec. 12, 2012; Ser. No. 61/736,103, filed Dec. 12, 2012; Ser. No. 61/735,314, filed Dec. 10, 2012; Ser. No. 61/734,457, filed Dec. 7, 2012; Ser. No. 61/733,598, filed Dec. 5, 2012; Ser. No. 61/733,093, filed Dec. 4, 2012; Ser. No. 61/710,924, filed Oct. 8, 2012; Ser. No. 61/696,416, filed Sep. 4, 2012; Ser. No. 61/682,995, filed Aug. 14, 2012; Ser. No. 61/682,486, filed Aug. 13, 2012; Ser. No. 61/680,883, filed Aug. 8, 2012; Ser. No. 61/678,375, filed Aug. 1, 2012; Ser. No. 61/676,405, filed Jul. 27, 2012; Ser. No. 61/666,146, filed Jun. 29, 2012; Ser. No. 61/653,665, filed May 31, 2012; Ser. No. 61/653,664, filed May 31, 2012; Ser. No. 61/648,744, filed May 18, 2012; Ser. No. 61/624,507, filed Apr. 16, 2012; Ser. No. 61/616,126, filed Mar. 27, 2012, which are all hereby incorporated herein by reference in their entireties. The system may communicate with other communication systems via any suitable means, such as by utilizing aspects of the systems described in PCT Application No. PCT/US10/038477, filed Jun. 14, 2010, and/or U.S. patent application Ser. No. 13/202,005, filed Aug. 17, 2011, now U.S. Pat. No. 9,126,525, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,123,168; 7,004,606; 6,946,978; 7,038,577; 6,353,392; 6,320,176; 6,313,454 and 6,824,281, and/or International Publication No. WO 2010/099416, published Sep. 2, 2010, and/or PCT Application No. PCT/US10/47256, filed Aug. 31, 2010 and published Mar. 10, 2011 as International Publication No. WO 2011/028686, and/or U.S. patent application Ser. No. 12/508,840, filed Jul. 24, 2009, and published Jan. 28, 2010 as U.S. Pat. Publication No. US 2010-0020170, and/or PCT Application No. PCT/US2012/048110, filed Jul. 25, 2012, and published on Jan. 31, 2013 as International Publication No. WO 2013/016409, and/or U.S. patent application Ser. No. 13/534,657, filed Jun. 27, 2012, and published on Jan. 3, 2013 as International Publication No. WO 2013/0002873, which are all hereby incorporated herein by reference in their entireties. The camera or cameras may comprise any suitable cameras or imaging sensors or camera modules, and may utilize aspects of the cameras or sensors described in U.S. patent application Ser. No. 12/091,359, filed Apr. 24, 2008 and published Oct. 1, 2009 as U.S. Publication No. US-2009-0244361, and/or Ser. No. 13/260,400, filed Sep. 26, 2011, now U.S. Pat. Nos. 8,542,451, and/or 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606 and/or 7,720,580, and/or U.S. patent application Ser. No. 10/534,632, filed May 11, 2005, now U.S. Pat. No. 7,965,336; and/or PCT Application No. PCT/US2008/076022, filed Sep. 11, 2008 and published Mar. 19, 2009 as International Publication No. WO 2009/036176, and/or PCT Application No. PCT/US2008/078700, filed Oct. 3, 2008 and published Apr. 9, 2009 as International Publication No. WO 2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,720,580; 7,038,577; 5,929,786 and/or 5,786,772, and/or U.S. patent application Ser. No. 11/239,980, filed Sep. 30, 2005, now U.S. Pat. No. 7,881,496, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. patent application Ser. No. 10/538,724, filed Jun. 13, 2005 and published Mar. 9, 2006 as U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. Nos. 7,255,451 and/or 7,480,149; and/or U.S. patent application Ser. No. 11/226,628, filed Sep. 14, 2005 and published Mar. 23, 2006 as U.S. Publication No. US-2006-0061008, and/or Ser. No. 12/578,732, filed Oct. 14, 2009, now U.S. Pat. No. 9,487,144, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, now U.S. Pat. No. 9,264,672, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. patent application Ser. No. 11/226,628, filed Sep. 14, 2005 and published Mar. 23, 2006 as U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in PCT Application No. PCT/US2011/056295, filed Oct. 14, 2011 and published Apr. 19, 2012 as International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in PCT Application No. PCT/US10/25545, filed Feb. 26, 2010 and published on Sep. 2, 2010 as International Publication No. WO 2010/099416, and/or PCT Application No. PCT/US10/47256, filed Aug. 31, 2010 and published Mar. 10, 2011 as International Publication No. WO 2011/028686, and/or PCT Application No. PCT/US2011/062834, filed Dec. 1, 2011 and published Jun. 7, 2012 as International Publication No. WO 2012/075250, and/or PCT Application No. PCT/US2012/048993, filed Jul. 31, 2012, and published on Feb. 7, 2013 as International Publication No. WO 2013/019795, and/or PCT Application No. PCT/US11/62755, filed Dec. 1, 2011 and published Jun. 7, 2012 as International Publication No. WO 2012-075250, and/or PCT Application No. PCT/CA2012/000378, filed Apr. 25, 2012, and published on Nov. 1, 2012 as International Publication No. WO 2012/145822, and/or PCT Application No. PCT/US2012/066571, filed Nov. 27, 2012, and published on Jun. 6, 2013 as International Publication No. WO 2013/081985, and/or PCT Application No. PCT/US2012/068331, filed Dec. 7, 2012, and published on Jun. 13, 2013 as International Publication No. WO 2013/086249, and/or PCT Application No. PCT/US2013/022119, filed Jan. 18, 2013, and published on Jul. 25, 2013 as International Publication No. WO 2013/109869, and/or U.S. patent application Ser. No. 13/333,337, filed Dec. 21, 2011, now U.S. Pat. No. 9,264,672, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. patent application Ser. No. 12/091,525, filed Apr. 25, 2008, now U.S. Pat. No. 7,855,755; Ser. No. 11/226,628, filed Sep. 14, 2005 and published Mar. 23, 2006 as U.S. Publication No. US-2006-0061008; and/or Ser. No. 10/538,724, filed Jun. 13, 2005 and published Mar. 9, 2006 as U.S. Publication No. US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and 6,124,886, and/or U.S. patent application Ser. No. 10/538,724, filed Jun. 13, 2005 and published Mar. 9, 2006 as U.S. Publication No. US-2006-0050018, which are hereby incorporated herein by reference in their entireties.

While the foregoing provides certain non-limiting example embodiments, it should be understood that combinations, subsets, and variations of the foregoing are contemplated. The monopoly sought is defined by the claims.

The invention claimed is:

1. A vehicular display system comprising:

a camera configured to be disposed at a vehicle so as to have an exterior field of view, said camera operable to capture image data, the captured image data representative of a scene within the field of view of said camera;

a processing system operable to process image data captured by said camera;

wherein, with said camera disposed at the vehicle and capturing image data, said processing system processes captured image data to generate an output representative of an image for display at a display device disposed in the vehicle for viewing by a driver of the vehicle, and wherein said display device comprises a single display screen for displaying images for viewing by the driver of the vehicle;

wherein said display device, responsive to the output generated by said processing system, displays the image at said single display screen;

wherein the image, when displayed at said single display screen of said display device, has three individual image panes including (i) a first image pane derived from a first subset of image data, (ii) a second image pane derived from a second subset of image data and (iii) a third image pane derived from a third subset of image data, and wherein said first image pane comprises a central image pane of the displayed image and said second image pane comprises a left-side image pane at a left side of said central image pane and said third image pane comprises a right-side image pane at a right side of said central image pane;

wherein, when the image is displayed at said single display screen of said display device, each of said central image pane, said left-side image pane and said right-side image pane displayed at said single display screen has a respective upper edge and a respective lower edge;

wherein said upper edge of said left-side image pane is not parallel to said lower edge of said left-side image pane, and wherein said upper edge of said right-side image pane is not parallel to said lower edge of said right-side image pane;

wherein said upper edge of said left-side image pane is not parallel to said upper edge of said right-side image pane, and wherein said lower edge of said left-side image pane is not parallel to said lower edge of said right-side image pane;

wherein said upper edge of said left-side image pane is not parallel to said upper edge of said central image pane, and wherein said upper edge of said right-side image pane is not parallel to said upper edge of said central image pane; and wherein said lower edge of said left-side image pane is not parallel to said lower edge of said central image pane, and wherein said lower edge of said right-side image pane is not parallel to said lower edge of said central image pane.

2. The vehicular display system of claim 1, wherein, when the image is displayed at said single display screen of said display device, said upper edge of said left-side image pane slopes downwardly away from said central image pane at the left side of said central image pane and said upper edge of said right-side image pane slopes downwardly away from said central image pane at the right side of said central image pane.

3. The vehicular display system of claim 2, wherein, when the image is displayed at said single display screen of said display device, said lower edge of said left-side image pane slopes upwardly away from said central image pane at the left side of said central image pane and said lower edge of said right-side image pane slopes upwardly away from said central image pane at the right side of said central image pane.

4. The vehicular display system of claim 1, wherein, when the image is displayed at said single display screen of said display device, said upper edge of said left-side image pane slopes upwardly away from said central image pane at the left side of said central image pane and said upper edge of said right-side image pane slopes upwardly away from said central image pane at the right side of said central image pane.

5. The vehicular display system of claim 4, wherein, when the image is displayed at said single display screen of said display device, said lower edge of said left-side image pane slopes downwardly away from said central image pane at the left side of said central image pane and said lower edge of said right-side image pane slopes downwardly away from said central image pane at the right side of said central image pane.

6. The vehicular display system of claim 1, wherein the scene in the field of view of said camera encompasses a bumper of the vehicle, and wherein the displayed image contains at least a portion of the bumper of the vehicle.

7. The vehicular display system of claim 1, wherein said left-side image pane and said right-side image pane are shaped and arranged with respect to said central image pane to appear folded with respect to said central image pane when the image is displayed at said single display screen.

8. The vehicular display system of claim 1, wherein said central image pane has horizontal upper and lower edges when the image is displayed at said single display screen.

9. The vehicular display system of claim 1, wherein the displayed image further includes static vertical bands displayed at said single display screen, each static vertical band separating said central image pane from a respective one of said left-side image pane and said right-side image pane.

10. The vehicular display system of claim 1, wherein the displayed image further includes static triangular regions displayed at said single display screen, the static triangular regions positioned above and below said left-side image pane and said right-side image pane.

11. The vehicular display system of claim 1, wherein the displayed image further includes static trapezoidal regions displayed at said single display screen above and below said central image pane, said left-side image pane and said right-side image pane.

12. The vehicular display system of claim 1, wherein said single display screen comprises a rectangular display screen having an upper border and a lower border, and wherein said upper edge of said central image pane is parallel to said upper border of said single display screen.

13. A vehicular display system comprising:

a camera configured to be disposed at a vehicle so as to have an exterior field of view, said camera operable to capture image data, the captured image data representative of a scene within the field of view of said camera;

a processing system operable to process image data captured by said camera;

wherein, with said camera disposed at the vehicle and capturing image data, said processing system processes captured image data to generate an output representative of an image for display at a display device disposed in the vehicle for viewing by a driver of the vehicle, and wherein said display device comprises a single display screen for displaying images for viewing by the driver of the vehicle;

wherein said display device, responsive to the output generated by said processing system, displays the image at said single display screen;

wherein the image, when displayed at said single display screen of said display device, has three individual image panes including (i) a first image pane derived from a first subset of image data, (ii) a second image pane derived from a second subset of image data and (iii) a third image pane derived from a third subset of image data, and wherein said first image pane comprises a central image pane of the displayed image and said second image pane comprises a left-side image pane at a left side of said central image pane and said third image pane comprises a right-side image pane at a right side of said central image pane;

wherein, when the image is displayed at said single display screen of said display device, each of said central image pane, said left-side image pane and said right-side image pane displayed at said single display screen has a respective upper edge and a respective lower edge;

wherein said single display screen comprises a rectangular display screen having an upper border and a lower border, and wherein said upper edge of said central image pane is parallel to said upper border of said single display screen;

wherein said upper edge of said left-side image pane is not parallel to said lower edge of said left-side image pane, and wherein said upper edge of said right-side image pane is not parallel to said lower edge of said right-side image pane;

wherein said upper edge of said left-side image pane is not parallel to said upper edge of said right-side image pane, and wherein said lower edge of said left-side image pane is not parallel to said lower edge of said right-side image pane;

wherein said upper edge of said left-side image pane is not parallel to said upper edge of said central image pane, and wherein said upper edge of said right-side image pane is not parallel to said upper edge of said central image pane;

wherein said lower edge of said left-side image pane is not parallel to said lower edge of said central image pane, and wherein said lower edge of said right-side image pane is not parallel to said lower edge of said central image pane;

wherein, when the image is displayed at said single display screen of said display device, said upper edge of said left-side image pane slopes downwardly away from said central image pane at the left side of said central image pane and said upper edge of said right-side image pane slopes downwardly away from said central image pane at the right side of said central image pane; and wherein, when the image is displayed at said single display screen of said display device, said lower edge of said left-side image pane slopes upwardly away from said central image pane at the left side of said central image pane and said lower edge of said right-side image pane slopes upwardly away from said central image pane at the right side of said central image pane.

14. The vehicular display system of claim 13, wherein the scene in the field of view of said camera encompasses a bumper of the vehicle, and wherein the displayed image contains at least a portion of the bumper of the vehicle.

15. The vehicular display system of claim 13, wherein the displayed image further includes static vertical bands displayed at said single display screen, each static vertical band separating said central image pane from a respective one of said left-side image pane and said right-side image pane.

16. The vehicular display system of claim 13, wherein the displayed image further includes static triangular regions displayed at said single display screen, the static triangular regions positioned above and below said left-side image pane and said right-side image pane.

17. A vehicular display system comprising:

a camera configured to be disposed at a vehicle so as to have an exterior field of view, said camera operable to capture image data, the captured image data representative of a scene within the field of view of said camera;

a processing system operable to process image data captured by said camera;

wherein, with said camera disposed at the vehicle and capturing image data, said processing system processes captured image data to generate an output representative of an image for display at a display device disposed in the vehicle for viewing by a driver of the vehicle, and wherein said display device comprises a single display screen for displaying images for viewing by the driver of the vehicle;

wherein said display device, responsive to the output generated by said processing system, displays the image at said single display screen;

wherein the image, when displayed at said single display screen of said display device, has three individual image panes including (i) a first image pane derived from a first subset of image data, (ii) a second image pane derived from a second subset of image data and (iii) a third image pane derived from a third subset of image data, and wherein said first image pane comprises a central image pane of the displayed image and said second image pane comprises a left-side image pane at a left side of said central image pane and said third image pane comprises a right-side image pane at a right side of said central image pane;

wherein, when the image is displayed at said single display screen of said display device, each of said central image pane, said left-side image pane and said right-side image pane displayed at said single display screen has a respective upper edge and a respective lower edge;

wherein said single display screen comprises a rectangular display screen having an upper border and a lower border, and wherein said upper edge of said central image pane is parallel to said upper border of said single display screen;

wherein said upper edge of said left-side image pane is not parallel to said lower edge of said left-side image pane, and wherein said upper edge of said right-side image pane is not parallel to said lower edge of said right-side image pane;

wherein said upper edge of said left-side image pane is not parallel to said upper edge of said right-side image pane, and wherein said lower edge of said left-side image pane is not parallel to said lower edge of said right-side image pane;

wherein said upper edge of said left-side image pane is not parallel to said upper edge of said central image pane, and wherein said upper edge of said right-side image pane is not parallel to said upper edge of said central image pane;

wherein said lower edge of said left-side image pane is not parallel to said lower edge of said central image pane, and wherein said lower edge of said right-side image pane is not parallel to said lower edge of said central image pane;

wherein, when the image is displayed at said single display screen of said display device, said upper edge of said left-side image pane slopes upwardly away from said central image pane at the left side of said central image pane and said upper edge of said right-side image pane slopes upwardly away from said central image pane at the right side of said central image pane; and wherein, when the image is displayed at said single display screen of said display device, said lower edge of said left-side image pane slopes downwardly away from said central image pane at the left side of said central image pane and said lower edge of said right-side image pane slopes downwardly away from said central image pane at the right side of said central image pane.

18. The vehicular display system of claim 17, wherein the scene in the field of view of said camera encompasses a bumper of the vehicle, and wherein the displayed image contains at least a portion of the bumper of the vehicle.

19. The vehicular display system of claim 17, wherein the displayed image further includes static vertical bands displayed at said single display screen, each static vertical band separating said central image pane from a respective one of said left-side image pane and said right-side image pane.

20. The vehicular display system of claim 17, wherein the displayed image further includes static trapezoidal regions displayed at said single display screen above and below said central image pane, said left-side image pane and said right-side image pane.

* * * * *